United States Patent
Dasari et al.

(10) Patent No.: US 11,552,956 B2
(45) Date of Patent: *Jan. 10, 2023

(54) SECURE RESOURCE AUTHORIZATION FOR EXTERNAL IDENTITIES USING REMOTE PRINCIPAL OBJECTS

(71) Applicant: Microsoft Technology Licensing, LLC, Redmond, WA (US)

(72) Inventors: Charles Prakash Rao Dasari, Redmond, WA (US); Maksym Yaryn, Sammamish, WA (US); Debashis Choudhury, Redmond, WA (US); Jeffrey A. Staiman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,816

(22) Filed: Nov. 29, 2021

(65) Prior Publication Data

US 2022/0086165 A1    Mar. 17, 2022

Related U.S. Application Data

(63) Continuation of application No. 16/887,985, filed on May 29, 2020, now Pat. No. 11,233,800.

(51) Int. Cl.
*H04L 29/06* (2006.01)
*G06F 21/62* (2013.01)
(Continued)

(52) U.S. Cl.
CPC ........ *H04L 63/102* (2013.01); *H04L 41/0686* (2013.01); *H04L 63/108* (2013.01); *H04L 63/20* (2013.01); *H04L 67/1097* (2013.01)

(58) Field of Classification Search
CPC ..... H04L 63/102; H04L 63/108; H04L 63/20; H04L 63/104; H04L 41/0686; H04L 67/1097
(Continued)

(56) References Cited

U.S. PATENT DOCUMENTS 10,025,942 B2 * 7/2018 Schaefer ............... G06F 21/604
10,318,265 B1 * 6/2019 To ....................... G06F 9/45558
(Continued)

OTHER PUBLICATIONS

"Non Final Office Action Issued in U.S. Appl. No. 16/887,893", dated Jan. 14, 2022, 6 Pages.
(Continued)

*Primary Examiner* — Ruolei Zong
(74) *Attorney, Agent, or Firm* — Fiala & Weaver P.L.L.C.

(57) ABSTRACT

Methods of secure resource authorization for external identities using remote principal objects are performed by systems and devices. An external entity creates a user group and defines entitlements to an owning entity's secure resource as a set of permissions for the group. An immutable access template with the permissions and an access policy for the secure resource are provided to the owning entity for approval. On approval, a remote principal object is created in the owner directory according to the permissions and access policy. A remote principal that is a group member requests access via an interface to the owner domain using external domain credentials. The identity of the remote principal is verified against the remote principal object by a token service. Verification causes generation and issuance of a token, with the enumerated entitlements, to the remote principal interface affecting a redirect for access to the secure resource.

20 Claims, 9 Drawing Sheets

(51) Int. Cl.
  *H04L 9/40*      (2022.01)
  *H04L 67/1097*   (2022.01)
  *H04L 41/0686*   (2022.01)

(58) Field of Classification Search
  USPC .......................................................... 726/4
  See application file for complete search history.

(56) References Cited

U.S. PATENT DOCUMENTS

| | | | |
|---|---|---|---|
| 2011/0161962 A1* | 6/2011 | Laksberg | G06F 9/52 |
| | | | 718/102 |
| 2011/0196935 A1 | 8/2011 | Rideout et al. | |
| 2015/0269390 A1* | 9/2015 | Schaefer | G06F 21/604 |
| | | | 707/781 |
| 2016/0255089 A1* | 9/2016 | Diestler | G06F 21/6236 |
| | | | 726/4 |
| 2017/0323086 A1* | 11/2017 | Lopez-Uricoechea | |
| | | | H04L 63/104 |
| 2018/0083835 A1* | 3/2018 | Cole | H04L 41/12 |
| 2019/0065278 A1* | 2/2019 | Jeuk | G06F 9/455 |
| 2019/0286832 A1* | 9/2019 | Szeto | H04W 12/082 |
| 2021/0377276 A1 | 12/2021 | Dasari et al. | |

OTHER PUBLICATIONS

"Notice of Allowance Issued in U.S. Appl. No. 16/887,893", dated Jun. 23, 2022, 5 Pages.
"Notice of Allowance Issued in U.S. Appl. No. 16/887,893", dated Sep. 28, 2022, 5 Pages.

\* cited by examiner

```
Token

"aud": "https://graph.<DomainName>.com",
  "iss": "https://sts.<stsHost>.net/customer-tenant-guid/",
  "idp": "https://sts.<stsHost>.net/partner-tenant-guid/",
  "iat": 1577501779,
  "nbf": 1577501779,
  "exp": 1577505679,
  "app_displayname": "<Service/ApplicationName>",
  "appid": "1950a258-227b-4e31-a9cf-717495945fc2",
  "ipaddr": "131.107.160.38",
  "platf": "3",
  "roles": "Directory.Read.All",
  "scp": "user_impersonation",
  ["rpo": Optional claim application can subscribe to, has
meaningful value per scenario/task]
  "tid": "72f988bf-86f1-41af-91ab-2d7cd011db47",
  "uti": "GMy-TvzlEkeylxR-5-UBAA",
  "ver": "1.0",
  "wids": [
    "00000000-900d-f00d-0000-000000000000"
  ],
}
```

FIG. 6

SECURE RESOURCE AUTHORIZATION FOR EXTERNAL IDENTITIES USING REMOTE PRINCIPAL OBJECTS

CROSS-REFERENCE TO RELATED APPLICATION(S)

This application is a continuation of U.S. patent application Ser. No. 16/887,985, now allowed, entitled "SECURE RESOURCE AUTHORIZATION FOR EXTERNAL IDENTITIES USING REMOTE PRINCIPAL OBJECTS," and filed on May 29, 2020, the entirety of which is incorporated by reference herein.

BACKGROUND

Owners of data resources often allow external identities access to their data resources for a variety of reasons such as collaboration, technical support, etc. One practice for authorization and access of external identities is for the data resource owner to add an entry in their directory for a particular external identity which enables login access, while other practices include variations on guest credential implementations which also include owner directory entries having limited permissions specific to the data resources to be accessed. In each case, however, the owner of the data resources defines the permissions and is able to alter the types of accesses allowed and the data resources that may be accessed by the external identities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods of secure resource authorization for external identities using remote principal objects are performed by systems and devices. An external entity creates a group of users from within its domain and defines entitlements to a secure resource, of an owner entity of a different domain, as a set of permissions for the group. An access template with the permissions and an access policy for the secure resource are provided to the owning entity for approval. The permissions and access policy are immutable by the owning entity. On approval for the access by the owning entity, a remote principal object is created in the owner directory according to the permissions and access policy. A remote principal that is a member of the group requests access via a user interface to the owner domain using external domain credentials. The claim of the remote principal is verified against the remote principal object by a token service. Verification of resource access permissions for the remote principal causes the generation and issuance of a token, with the enumerated entitlements, to the user interface of the remote principal to affect a redirect of the user interface for access to the secure resource.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 6 shows a token for secure resource authorization of external identities using remote principal objects, in accordance with an example embodiment.

Figure 1A:
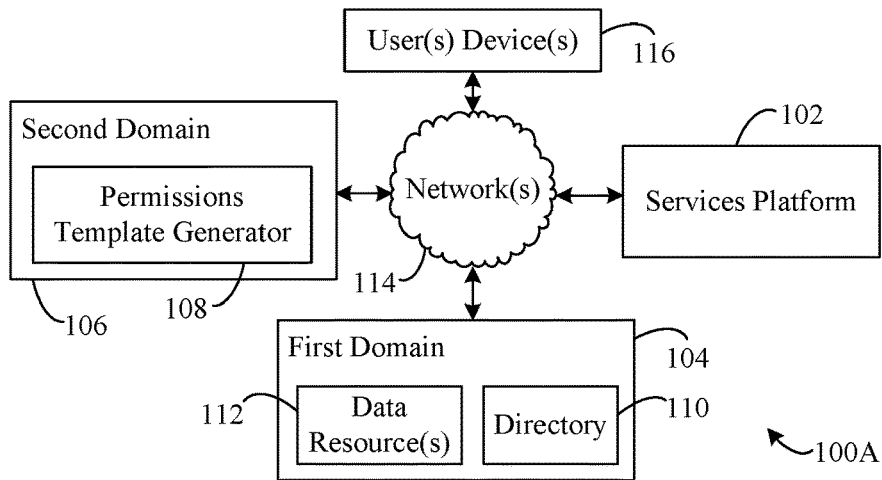
FIG. 1A shows a block diagram of a system for secure resource authorization of external identities using remote principal objects, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for secure resource authorization for external identities using remote principal objects. Section III below describes example mobile and computing devices that may be used to implement features of the embodiments described herein. Section IV below describes additional examples and advantages, and Section V provides some concluding remarks.

II. Example Embodiments for Secure Resource Authorization for External Identities using Remote Principal Objects Methods of secure resource authorization for external identities using remote principal objects are performed by systems and devices. Various embodiments herein are directed to cloud-based systems, such as but not limited to, cloud services, cloud hosted tenancies, directories, code repository systems, file sharing services, etc., as well as to enterprise systems and other domain systems through which client/user systems and/or devices access secure data resources in performance of tasks, and according to embodiments, implement secure resource authorization for external identities using remote principal objects (also "RPOs" herein).

In order to perform a task involving a secure data resource in a domain remote to their own, a user or principal needs access to the domain of the secure data resource. With the scale at which large enterprises operate, this need grows well beyond a small number of users/principals into several teams or groups with potentially multiple shifts, trainees, etc. For instance, in order to offer support for certain applications and services, a provider may employ hundreds or thousands of engineers across the platform applications and services in various teams or groups spread across multiple geographical locations, including vendors. Additionally, it is possible that for each task several support engineers, technical advisors, and/or product group engineers are assigned to and/or take part in performance thereof. In the context of collaboration tasks between domains, access to secure data resources is also of importance.

The embodiments herein enable ways to represent a remote user as a remote principal for access secure data resources in the domains of their owners for performing tasks.

A domain, as used herein, generally refers to a physical and/or logical boundary under the control of an entity within which data resources are securely stored and access thereto requires domain-specific credentials, and also encompasses subdomains and/or the like in embodiments. Exemplary, non-limiting domains include, without limitation, web domains, tenancies of hosted cloud platforms, cloud service providers, enterprise systems, and/or any other type of network or system requiring domain-specific credentials for authentication and access thereto. A tenant is particular type of domain that is a representation of an organization in a cloud or identity platform. The domain of the tenant in the cloud platform is its tenancy in which the tenant registers and manages applications, stores data/files, accesses services, etc. In embodiments, a remote principal is a person, a group of people, an application(s), a service(s), etc., or any combination thereof, which belongs to a remote or external domain, that is intending to access secure data resources in the domains of their owners for performing tasks. A data resource or secure data resource is/are data, information, files, documents, configuration settings of services/applications, and/or the like which securely reside in one domain and are not readily accessible to principals of other domains without credentials of owner domain, and an entitlements lifecycle manager (ELM) service is configured to govern the entitlement grants, for secure data resources, and their lifecycles.

The described embodiments also enable the capture of the permissions that are to be granted to these remote users/remote principals. A remote principal and the permissions being requested therefor are defined (e.g., in templates generated and offered by the remote domain entity or by the domain of the data resource to be accessed, or as other data/information representations than templates), and provided to a directory of the resource owner domain. In the case of customer support offered by provider, the provider defines the secure data resource to which they need access in order to provide proper support to the customers for task completion, in embodiments. Embodiments provide for the data resource owners to have the ability to approve or reject access requests on a per-task basis. However, in some embodiments, data resource owners may not have the ability to modify the requested set of permissions as this ability can hinder the remote principal from providing proper support (e.g., if the data resource owner removes required permissions) or expose the remote principal and/or its organization to unwanted risks (e.g., if the data resource owner grants more than the required permissions). To this end, requests to expand or contract the set of access permissions originate from the organization of the remote principal and not the data resource owner, in embodiments. However, the data resource owner does retain control on whether or not to approve the access permissions and when the access permissions may be revoked.

Accordingly, embodiments provide that the lifecycle of such access by a remote principal, and the permissions sought, are tightly governed by an access policy, as well as being immutable for within the domain of the data resource owner. In embodiments, there are at least two conditions that control the access to data resources: the remote principal is the member of a group corresponding to the task that was created in the domain of the data resource owner, and a remote principal object exists in the domain of the data resource owner that points to this group. These conditions are based on the lifecycle for the access, according to embodiments. For example, remote principal membership in the group created for data resource access is governed by an entitlements lifecycle manager (ELM) service access package that is created in the remote principal domain. When the access policy expires the entitlement, the remote principal(s) are removed from this group. This ensures that the remote principal(s) will not get access to the data resources outside of the specified policy. In the same manner, the remote principal object creation and deletion in the domain of the secure data resource owner is governed by the ELM service. When access to the data resource is approved in the owner domain, an automatic-approval access policy is created in this domain and the corresponding access packages are linked to that policy. This access policy is responsible for expiring the entitlement grants, and the ELM service is configured to clean up the remote principal object and its links. The access policy itself is cleaned up after the task is closed or completed, in embodiments, or when a revocation of the approval to access the data resource is made from the owner domain via a lockbox application/service, or other equivalent application/service or the like, e.g., via the ELM service or another trusted service. In other words, ELM utilization in the context of remote principals and remote principal objects improves system utilization for access to secure data resources at least because access can be reliably and quickly added and/or removed without a requirement to track any lists of remote users in the remote domain, or any particular list of access grants/permissions that exist for the remote principal objects in various workloads in the resource owner domain. Further details regarding the ELM service and lockbox utilization are provided below.

As a non-limiting example, a cloud-based platform having services utilizes remote principal objects to allow access for a secure data resource of a tenant in a first domain by a user/member of a second domain, such as a partner or service provider. As another example, an enterprise network owner of a secure data resource allows access by a remote third party to the secure data resource via a remote principal object. For instance, embodiments enable the ability in a directory of a secure data resource owner to create remote principal objects and assign authorization claims for remote principals that are linked via the remote principal objects based on permissions and an access policy that define secure data resource accesses for a remote principal. A remote principal, in embodiments, is any principal, including users, applications, etc., coming from any identity provider (IdP), tenant, or domain, either first party or third party, that is trusted by a current IdP such as of a home tenant/domain/host. The remote principal object points to the authorization claim that is verified through incoming tokens from the remote IdP to issue a new token corresponding to the secure data resource requested at the current IdP. The embodiments herein describe this ability to assign authorization to any type of remote principal and establish strong governance for authorization and access due to the fact it is a remote principal.

In the context of tenancies and support therefor, a customer tenant of a cloud-based services platform may require the help of a support engineer either in another tenancy or in the domain of the platform. In order to diagnose and solve customer problems for domain identity issues, as an example, support engineers need to inspect and analyze customer directory data together with service telemetry to arrive at a solution presentable to the customer. Customer problems with identity functionality may span across several services and/or products. The embodiments herein enable support engineers to access and browse customer directory data to quickly diagnose the problems and provide a solution. Furthermore, the embodiments provide transparency when the support engineer accesses customer data for business reasons, such as providing support. More generally, remote principal objects enable a service to use its existing authorization framework to authorize requests to access secure data resources for external users, without either the implemented security system or the secure data resource itself requiring advance knowledge of specific, personally-identifiable information about each of the remote principals who can access the secure data resource. That is, such information is not provided in the directory of the resource owner or in the user profile store of the data resource itself. This preserves the ability of external domains to manage the list of their own remote users/remote principals who are authorized to manage secure data resources.

To this end, embodiments provide for secure access to customer data in which access to customer data be user/owner based, approved by the customer, scoped to specific task needs, and revoked automatically either by time-bound expiry, by customer intent, and/or by closure of the support case. As part of the solutions provided in the described examples herein, certain features pertaining to identity projection in directories are leveraged to fulfil the requirements of the customer support scenario. That is, identity projection provides a fundamental construct that allows application at layers above it to rely on the same authentication and authorization models they are built to understand, instead of injecting special case logic for various purposes. Embodiments also allow for extension to partners, and solve issues associated with business-to-business collaboration at the organization level for access to secure data resources, as opposed to the individual user level. Accordingly, a third party such as a support engineer is enabled to access support tools and data resources using their home tenant/domain identity (e.g., <thirdpartyname>.com), including customer-facing product experiences hosted for the customer corresponding to the support case the support engineer is working on, such as via a portal or other user interface (UI), e.g. https://portal.<cloudhostname>.com/<customername>.com. In embodiments herein, a portal refers to a UI of a webpage, service, or application that acts as a gateway or framework controlling access to resources, other webpages, services, or applications, etc., of a domain or subdomain, which is opened and accessed via credentials, although other types of portals are also contemplated herein as would be understood by persons of skill in the relevant art(s) having the benefit of this disclosure.

It should also be understood that example references to tenancies, customers, and support are provided for illustrative and explanatory purposes only, and are not limiting. The embodiments herein are extensible to collaboration, guest access, etc., for secure data resources between different users and owners of the secure data resources between any two, different domains. In the embodiments herein, a secure data resource may be referred to as a data resource for brevity. A domain, as used herein, generally refers to a physical and/or logical boundary under the control of an entity within which data resources are securely stored and access thereto requires domain-specific credentials, and also encompasses subdomains and/or the like in embodiments. Exemplary, non-limiting domains include, without limitation, web domains, tenancies of hosted cloud platforms, cloud service providers, enterprise systems, and/or any other type of network or system requiring domain-specific credentials for authentication and access thereto.

The embodiments herein provide for solutions to issues with secure resource authorization for external identities by using remote principal objects. These and other embodiments will be described in further detail below in this Section, in association with the Figures, and in Sections/Subsections that follow.

Figure 1B:
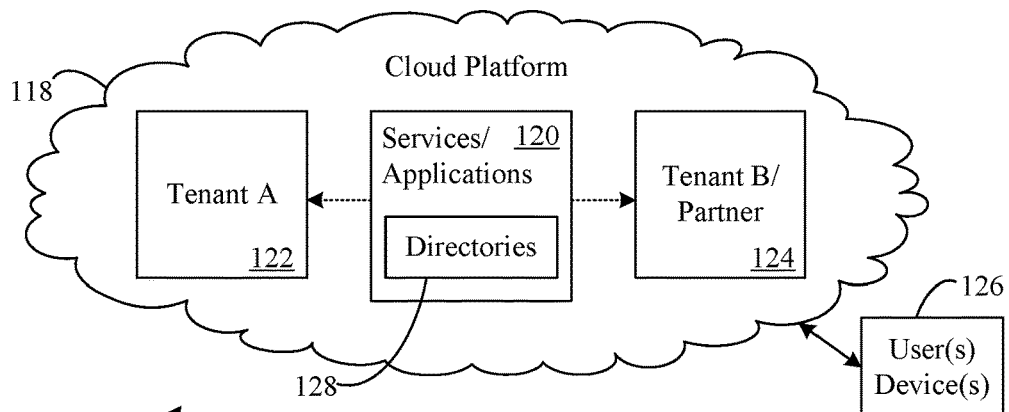
FIG. 1B shows a block diagram of a cloud-based system for secure resource authorization of external identities using remote principal objects, according to an example embodiment.

Systems, devices, and apparatuses may be configured in various ways for authorizing access by a remote principal of a second domain to a secure data resource in a first domain. For instance, FIG. 1A and FIG. 1B will now be described. FIG. 1A shows a block diagram of a system 100A, and FIG. 1B shows a block diagram of a cloud-based system 100B, each configured for secure resource authorization of external identities using remote principal objects, according to example embodiments.

As shown in FIG. 1A, system 100A includes user(s) device(s) 116, a services platform 102, a first domain host 104, and a second domain host 106. In embodiments, user(s) device(s) 116, services platform 102, first domain host 104, and second domain host 106 communicate with each other over a network 114. It should be noted that in various embodiments different numbers of user(s) device(s), services platforms, first domain hosts, and/or second domain hosts are present. Additionally, according to embodiments, any combination of the systems and/or components illustrated in FIG. 1A are present in system 100A.

Network 114 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User(s) device(s) 116 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for machine learning for secure resource authorization for external identities using remote principal objects, as well as for performing client-side functions/operations of client-server scenarios associated with embodiments such as access to a domain host, including data resources thereof, via user credentials. User(s) device(s) 116 also includes additional components (not shown for brevity and illustrative clarity) including, but not limited to, components and subcomponents of other devices and/or systems herein, in embodiments.

Services platform host 102 comprises one or more server computers or computing devices, which may include one or more distributed or "cloud-based" servers in embodiments, as described in further detail below. In embodiments, services platform host 102 comprises an on-premises server(s) in addition to, or in lieu of, cloud-based servers. Various systems/devices herein, such as services platform host 102, are configured to provide services utilized by first domain host 104, such as business services and/or applications, and/or to perform functions/operations for authenticating identities, e.g., as an IdP, for secure resource authorization for external identities using remote principal objects. For instance, services platform host 102 includes an IdP service that is configured to verify identities of users of user(s) device(s) 116 associated with a second domain of second domain host 106 and to issue tokens or the like for access to secure resources such as a data resource(s) 112 and/or a directory 110 of a first domain of first domain host 104 using remote principal objects, as further described herein.

First domain host 104 comprises one or more server computers or computing devices, such as an on-premises server(s) in addition to, or in lieu of, cloud-based servers, associated with the first domain. First domain host 104, as noted above, also includes data resource(s) 112 and directory 110. Data resource(s) 112 comprises one or more secure data resources, such as but without limitation, ones of files/file systems, documents, databases, repositories, calendars, and/or other applications/information, including configuration information for applications and services, and directory 110 comprises identity data and information of users associated with the first domain of first domain host 104 (e.g., including access permissions, credentials, etc.), and generated RPOs are stored in directory 110, in embodiments. Identity data and information in directory 110 comprises a portion of data resource(s) 112, in embodiments, and it is contemplated that applications and/or services of a domain, and data/information associated therewith, are also data resources herein, according to embodiments. Data resource(s) 112 and directory 110 are securely stored at or in association with first domain host 104, and are accessible via credentials associated with the first domain of first domain host 104 (e.g., via users of user(s) device(s) 116 with such first domain credentials), and in some embodiments, by an IdP of services platform 102. Data resource(s) 112 and directory 110 are not accessible via authentication to the first domain of first domain host 104 using credentials of the second domain of second domain host 106 (e.g., via users of user(s) device(s) 116 with such second domain credentials). In embodiments, directory 110 stores generated RPOs via which users with second domain credentials are granted access to data resource(s) 112 and/or directory 110, e.g., using the IdP of services platform 102.

Second domain host 106 comprises one or more server computers or computing devices, such as an on-premises server(s) in addition to, or in lieu of, cloud-based servers, associated with the second domain. A user associated with the second domain is enabled to access second domain host 106 via user(s) device(s) 116 with their second domain credentials. Second domain host 106 is configured to generate permissions templates via a permissions template generator 108. For example, a user in the second domain utilizes permissions template generator 108 to generate a permissions template that defines the access permissions/entitlements needed (e.g., read, write, etc.) for a specified data resource of data resource(s) 112, which includes identity data and information in directory 110, according to embodiments. Permissions templates generated in the second domain are immutable in the first domain; that is, a user in the first domain cannot change aspects of the permissions, or other data and information, in the permissions template. Permissions templates are used to generate access packages that include groups to access data resources, group member permissions for data resources, etc.

When provided to first domain host 104, an owner, administrator, or the like, of a data resource in the first domain that is specified in the permissions template accepts/approves, or does not accept/approve, the permissions template, and if accepted or approved, an RPO is subsequently generated, as discussed in further detail below, to allow a second domain user access to the data resource according to at least the permissions set forth in the permissions template.

Turning now to FIG. 1B, system 100B is a cloud-based embodiment of system 100A of FIG. 1A. As shown, system 100B includes a cloud platform 118. In embodiments, cloud platform 118 is a cloud-based platform such as Microsoft® Azure® from Microsoft Corporation of Redmond, WA, that is accessible by users of user(s) device(s) 126 over a network (not shown for illustrative clarity and brevity).

User(s) device(s) 126 may be any type and/or number of user device, such as devices similar to those described for user(s) device(s) 116 in FIG. 1A, and may correspond to users with credentials for different domains, such as different tenancies within cloud platform 118.

A tenant is a representation of an organization in a cloud or identity platform. The domain of the tenant in the cloud platform is its tenancy in which the tenant registers and manages applications, stores data/files, accesses services, etc. Tenants are enabled to deploy custom conditional access and tenant restrictions for their respective tenancies. A tenant is granted a dedicated instance of a directory for their tenancy, and each tenant is distinct and separate from other tenants and has its own representation of identities and application registrations. A registration inside of a tenancy allows authentications from accounts only within the tenancy for access to secure data resources, and while authentications from all tenants is also permitted, in the context of RPOs herein, access for all tenants is not assumed/used.

For instance, cloud platform 118 includes a tenant A 122 and a tenant B/partner 124, although different numbers of tenants are contemplated in embodiments. In embodiments, tenant A 122 corresponds to the first domain of system 100A, and tenant B/partner 124 corresponds to the second domain of system 100A. Users of user(s) device(s) 126 having credentials for tenant A 122 are allowed to authenticate for this tenancy and access data, information, services, applications, etc., e.g., services/applications 120 (also "services/apps" 120 herein) of cloud platform 118, allowed or instantiated for tenant A 122. Likewise, users of user(s) device(s) 126 having credentials for tenant B/partner 124 are allowed to authenticate for this tenancy and access data, information, services, applications, etc., e.g., services/apps 120 of cloud platform 118, allowed or instantiated for tenant B/partner 124. However, direct access to the domain of one tenant with user credentials of another tenant is not allowed.

Authentication is performed via directories 128 of cloud platform 118, in embodiments. Directories 128 include identity data and information for users allowed to authenticate to respective tenancies. For instance, each of tenant A 122 and tenant B/partner 124 is allocated or instantiated its own directory of directories 128, which are not accessible without credentials for the respective tenancies, or using the RPOs as described herein. Accordingly, in embodiments ones of directories 118 store generated RPOs that enable access, e.g., specific and/or limited access, to data resources and directory data/information for entities outside of the domain of the directory. In embodiments, directories 128 is a cloud-based directory service such as Azure® Active Directory® from Microsoft Corporation of Redmond, Wash., although embodiments are not so limited.

Cloud platform 118 includes one or more distributed or "cloud-based" servers, in embodiments. That is, cloud platform 118 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 118 is configured to support multi-tenancy as noted above, where cloud platform-based software services multiple tenants, with each tenant including one or more users who share common access to certain software services and applications of cloud platform 118, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Systems, devices, and apparatuses are configured in various ways for secure resource authorization for external identities using remote principal objects, in embodiments. For instance, FIGS. 2, 3, and 4 will now be described in this context.

Figure 2:
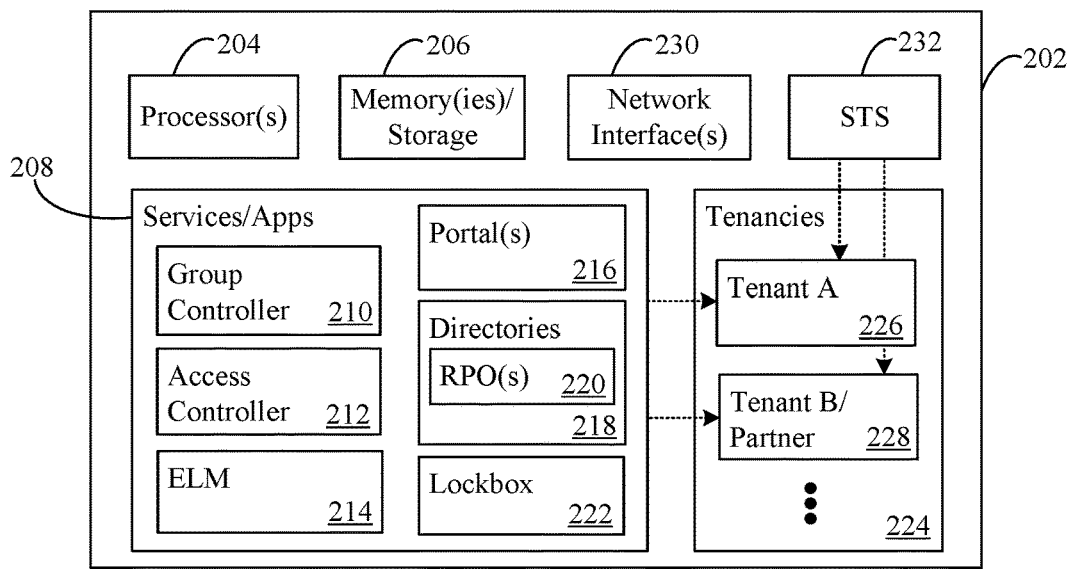
FIG. 2 shows a block diagram of a computing system configured for secure resource authorization of external identities using remote principal objects, according to an example embodiment.

Referring first to FIG. 2, a block diagram of a system 200 is shown for secure resource authorization for external identities using remote principal objects, according to an example embodiment. System 200 as exemplarily illustrated and described is configured to be an embodiment of system 100A of FIG. 1A and/or system 100B of FIG. 1B. System 200 is described as follows.

System 200 includes a computing system 202 which is any type of server or computing system, as mentioned elsewhere herein, or as otherwise known, including without limitation cloud-based systems, on-premises servers, distributed network architectures, and/or the like. As shown in FIG. 2, computing system 202 includes one or more processors ("processor") 204, one or more of a memory and/or other physical storage device ("memory") 206, as well as one or more network interfaces ("network interface") 230.

Computing system 202 also includes services/applications 208 (also "services/apps" 208 herein) that is an embodiment of services platform 102 and/or services/apps 120 of FIGS. 1A and 1B, respectively, tenancies 224 that is an embodiment of first domain host 104 and/or second domain host 106 of FIG. 1A, and/or tenant A 122 and/or tenant B/partner 124 of FIG. 1B, and a secure token service (STS) 232. STS 232 is a trusted third party token service, comprises a portion of services platform 102 and/or services/apps 120 of FIGS. 1A and 1B, respectively, comprises a separate service in system 200, or comprises a portion of services/apps 208, in different embodiments.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of services/apps 208 and/or STS 232, including one or more of the components thereof as described herein, which may be implemented as computer program instructions, as described herein.

Memory 206 includes volatile storage portions such as a random access memory (RAM) and/or persistent storage portions such as hard drives, non-volatile RAM, and/or the like, to store or be configured to store computer program instructions/code for secure resource authorization of external identities using remote principal objects as described herein, as well as to store other information and data described in this disclosure including, without limitation, services/apps 208 and/or STS 232, including one or more of the components thereof as described herein, and/or the like, in different embodiments. Memory 206 also includes storage of data resources and/or permissions templates (e.g., in a template catalog) in some embodiments. For instance, a directory for a domain is stored in memory 206 according to cloud-based embodiments for a tenant of tenancies 224.

Network interface 230 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG. 1A and/or system 100B in FIG. 1B, over a network such as network 114.

System 200 also includes additional components (not shown for brevity and illustrative clarity) including, but not limited to, components and subcomponents of other devices and/or systems herein, as well as those described below with respect to FIGS. 12-13, according to embodiments.

Tenancies 224 includes a tenant A 226 and a tenant B/partner 228 (or "tenant B/P 228" herein) as illustrated by way of non-limiting example, although any number of tenants may have a tenancy in embodiments. Tenants of tenancies 224 are each associated with a respective directory as described herein, and in further detail below, that stores identity data and information regarding users of the tenant via which authentication to the tenant domain is performed. In embodiments, a partner is a tenant with a particular association or relationship with a platform host. For example, a support center with support engineers who perform tasks, as described herein, is considered a partner. In embodiments, the domain of a partner is the domain of the platform, a subdomain of the platform, a domain associated with the platform, and/or the like. It is contemplated herein that tenancies and computing resources are loosely-coupled, in embodiments, where multiple tenants are hosted at a single computing resources, or where tenants are hosted across multiple computing resources, or in any other combination of implementation relationships.

Services/applications 208 and STS 232 are configured to perform aspects of secure resource authorization of external identities using remote principal objects as described herein, enabling users of a domain/tenancy that is outside of an owning domain/tenancy of a data resource to access the data resource. Services/applications 208 as illustrated includes a group controller 210, an access controller 212, an entitlements lifecycle manager (ELM) 214, one or more portals 216 ("portals" 216), directories 218, and a lockbox 222. Group controller 210 is configured to determine whether a principal is allowed membership in a group, or is in fact a member of the group, for access to a data resource in performance of a task, and access controller 212 is configured to generate the group, permission associated with the data resource, and access policies for the permissions. Portals 216 are configured to provide interfaces for users to services, applications, domains, and/or the like, described herein, and directories 218 are configured to store identity data and information for users of domains (such as tenant A 226 and tenant B/P 228 of tenancies 224) including but not limited to permissions and access credentials, as well as RPOs as described herein. Lockbox 222 is configured to provide a secure interface accessible by a data resource owner in which the owner can review and accept/reject permissions requests for data resources (in embodiments, lockbox 222 comprises a portion of portals 216), and ELM 214 is configured to govern grants of entitlements and lifecycles thereof including interfacing with group membership requests for group controller 210 and permissions approval requests to lockbox 222. In embodiments, ELM 214 and access controller 212 comprise portions of a single service or application, e.g., access controller 212 comprises a portion of ELM 214. STS 232 is configured to issue tokens with permissions for data resources that are specified in RPOs for a member of a group to which an RPO points.

While shown separately for illustration and conceptualization, in embodiments, one or more portions of services/applications 208 and/or STS 232 as described herein are instantiated for, and/or within, a tenant of tenancies 224. That is, tenants such as tenant A 226 and/or tenant B/P 228 may include their own instances of one or more portions of services/applications 208 and/or STS 232 to perform functions and services thereof.

Further details regarding components of services/applications 208 and STS 232 are provided herein, including with respect to the descriptions of the Figures below.

Figure 3:
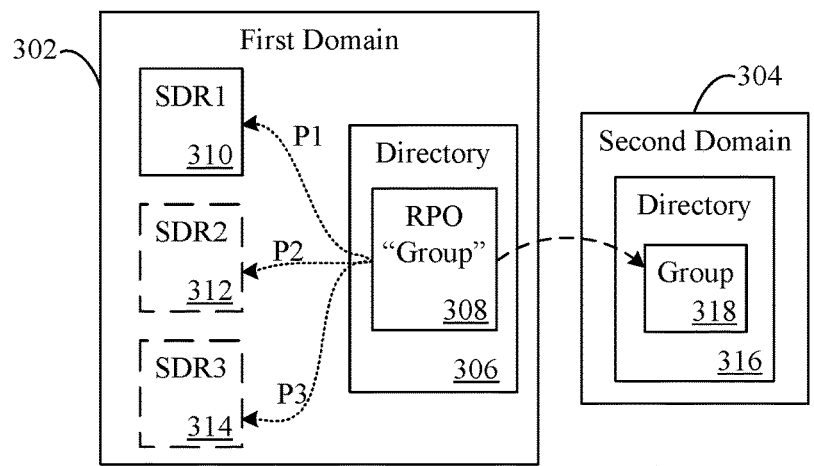
FIG. 3 shows a block diagram of a system with links and permissions of a remote principal object, in accordance with an example embodiment.

Referring now to FIG. 3, a block diagram of a system 300 with links and permissions of a remote principal object ("RPO") is shown, according to example embodiments. System 300 is described as follows.

System 300 includes a first domain 302 and a second domain 304. First domain 302 and second domain 304 are embodiments of any two, different domains, represented as hardware platforms, logical boundaries, software systems, and/or the like, as described herein (e.g., tenancies such as for tenant A 226 and tenant B/partner 228 of system 200 in FIG. 2, enterprise networks, web domains, etc.). That is, a user associated with first domain 302 has access credentials to this domain that are specifically associated therewith, such as user1@<FirstDomain302>.com, that enable and allow authorization of this user to first domain 302, including data resources therein. Likewise, a user associated with second domain 304 has access credentials to this domain that are specifically associated therewith, such as user2@<SecondDomain304>.com, that enable and allow authorization of this user to second domain 304, including data resources therein. In the context of a cloud platform, a First domain 302 has a directory 306 and a second domain 304 has a directory 316, in the illustrated embodiment, although any numbers of directories may be present and/or allocated. Directory 306 and directory 316 comprise identity data and information of users associated with first domain 302 and with second domain 304, respectively, including but not limited to, access permissions, credentials, etc. Additionally, generated RPOs, such as an exemplary RPO 308, are stored in directories of tenants that desire to allow access to secure data resources to outside entities (e.g., other tenants, individuals, and/or any other entity outside of a specific domain), according to embodiments. As previously noted, identity data/information, as well as any other information stored in a directory may comprise a portion of a data resource(s) of the domain that owns, or is assigned and manages, the directory. Directory 306 and directory 316 are tenant-specific directories of directories 218 of system 200 in FIG. 2, in some embodiments.

Second domain 304 has a group 318 associated therewith. Group 316 is a data structure, in embodiments, that includes one or more of a task identifier, at least one data resource associated with the task, and/or identities of one or more users (or members) of second domain 304 that are designated to perform the task.

Remote principal object 308 in directory 306 of first domain 302 represents a new type of directory object, having a type such as "group," as described herein. In embodiments, RPO 308 is a data structure and includes metadata and "links" that define the permissions associated with the principal(s) for applications and data resources. For example, as illustrated, group 318 includes one or more members of second domain 304 that are the principal, remote to first domain 302. RPO 308 in first domain 302 points to group 318 stored in second domain 304. RPO 308 exemplarily includes three "links" that define three different permissions, P1, P2, and P3, which are application permissions in embodiments, for respective secure data resources and/or applications in first domain 302: a first secure data resource (SDR1) 310, a second secure data resource (SDR2) 312, and a third secure data resource (SDR3) 314. When a token is issued by STS 232 in FIG. 2 for a member of group 318, pointed to by RPO 308, these "links" are looked up to find the suitable permissions for the requested data resource, and the determined permissions defined through these links are added to the permissions scope claim of the token.

An RPO such as RPO 308 includes attributes, e.g., as a data structure. In embodiments, for example, RPOs have one or more of these attributes: object identifier ("ID" or "Id"), type, remote object ID, remote domain ID, display name, sourced by, owner, purpose, etc. An object ID describes a unique ID for the RPO, and the type describes the type of object (e.g., "group") the RPO points to in the remote domain (e.g., second domain 304). The remote object ID is an identifier of the object in the remote domain to which the RPO points, and the remote domain ID is the identifier of the remote domain in which the group resides. The display name is a name of the object in the remote domain that is pointed to and is copied at the time of creation for the RPO, and is not required to be kept synchronized if/when the display name of the object in the remote domain changes. The sourced by attribute is a unique ID that denotes the source used to create the RPO, e.g., an ELM package identifier generated by access controller 212 of FIG. 2. The owner attribute is a globally unique ID representing the application ID of a service that manages the RPO, e.g., an ELM application ID such as the ID for ELM 214. According to embodiments, when this property is filled for an RPO, the RPO cannot be deleted, nor its links be modified, through any other application than the one listed for this attribute. The purpose attribute describes a purpose or task for which the RPO is created to facilitate querying RPOs for a given purpose or task, e.g., support case, workloads, subscriptions, document collaboration, managed service provider, etc.

Entitlements on resources and applications may include resource/application IDs and claims derived from the permissions linked an RPO to be included in tokens, in embodiments. An entitlement may include a resource ID "graph API" (application programming interface) and a claim of "directory.read.all," may include a resource ID "graph" and a claim of "user.read.all, group.read.all," or MailboxSettings.readwrite, as non-limiting examples, while more granular permissions and entitlements are also contemplated herein. Additionally, administrator claims can be included in tokens. Each task is enabled to demand a different set of entitlements based on the scope of the data of a data resource that is required or needed to be accessed, by users of the a remote domain, to resolve that particular task. The scope of the data can be determined based on task topic and/or the like.

In some embodiments, the set of permissions granted are be limited, e.g., to limit enumeration of all objects, e.g., data objects with end user identifying information (EUII). In such cases, a query relate to such data may return a limited result set on a partial match. Additionally, the reading of strong authorization details is limited in embodiments. For example, security questions used for a password reset, a registered phone number, and/or the like, are contemplated as being restricted from access. Instead, an indication of the presence of this type of data is provided, in embodiments, which does not reveal the actual data content. Moreover, in embodiments access to objects such as profile photos or other, additional personal information is limited. However, in some embodiments, access to portions of identifying information may be included in permissions based on an agreement therefor between data resource owners and accessors.

In embodiments, RPOs and their links are created, read, updated, or deleted by a single service or application such as a graph API, e.g., of ELM 214, for which there is not a user interface (UI) by which the RPOs can be viewed or managed. Additionally, as noted above, the RPO attribute 'owner' may be filled with an application ID or a service principal ID (e.g., of the ELM 214 service) and only that specific application/service is allowed to create or make any changes to the RPOs and their links, including deletion. That is, for some embodiments, the only control the owner/local domain, e.g., first domain 302, is permitted with respect to the RPOs is via the provided ELM access packages which can be revoked in the local domain for the grants against access package and the corresponding remote principal. However, in such cases, the RPO and its links are cleaned up, removed, or deleted by the ELM 214 service. Additionally, ELM 214 is configured to clean up/delete RPOs and associated links, access packages, permissions, access policies, etc., upon completion of a task.

In summary, RPOs include entity mappings where the PRO in the domain of the data resource owner is mapped to a group in user/remote principal domain, and allow for token issuance to users/remote principals when their membership in a group, pointed to by the RPO, is verified. RPO permissions allow for the user/principal to be issued the token with claims based on the "links" defined for the RPO. In embodiments for RPOs, there is no specific user/remote principal footprint in the domain of the data resource owner that corresponds to the identity of the user/remote principal.

As noted above for FIGS. 1-3, embodiments herein provide for secure resource authorization for external identities using remote principal objects. System 100A of FIG. 1A, system 100B of FIG. 1B, system 200 of FIG. 2, and system 300 of FIG. 3 may each be configured to perform such functions and operations. It is further contemplated that the systems and components described above are configurable to be combined in any way, in whole or in part, and that any portions of a given system may be combined in any way, in whole or in part.

Figure 4:
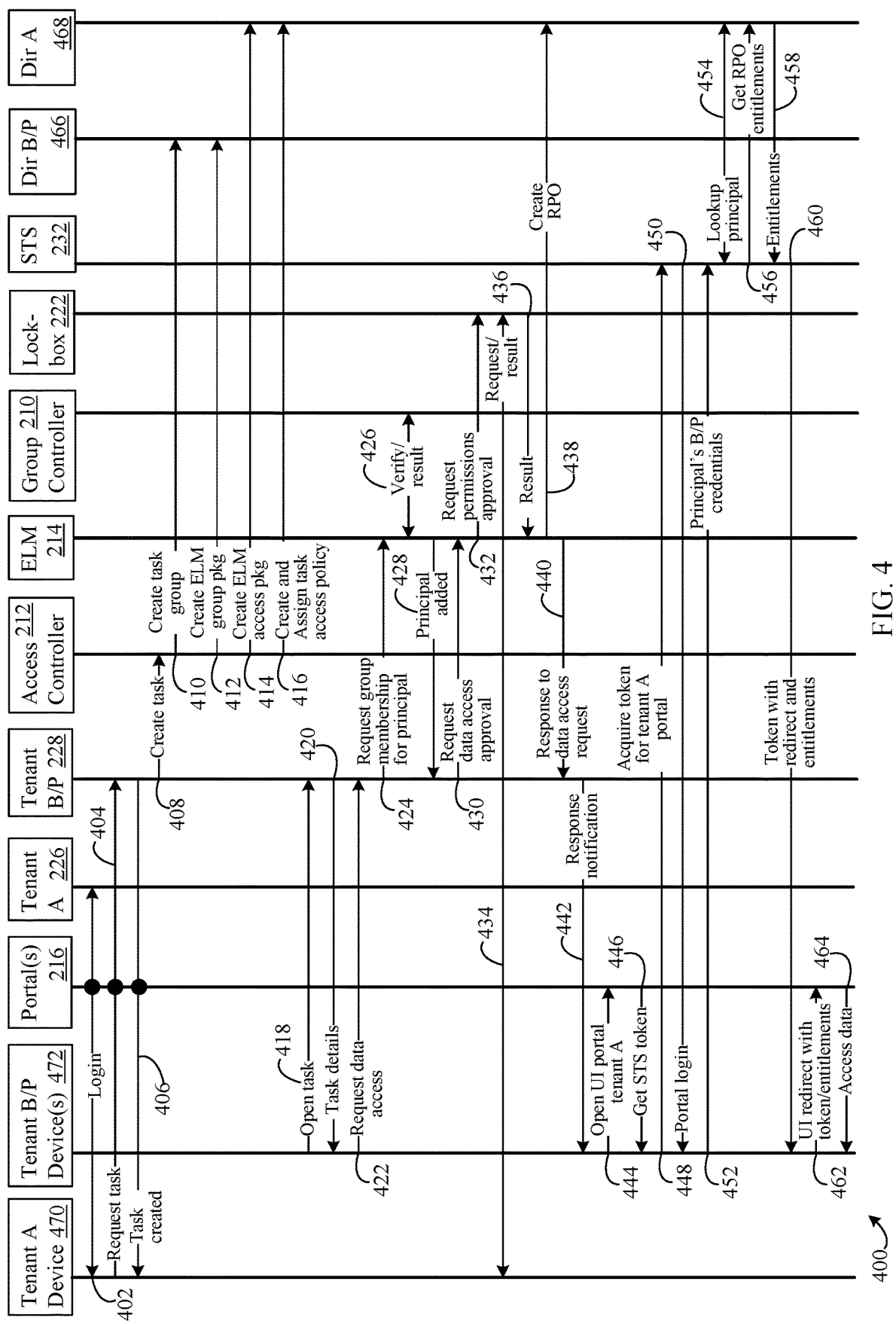
FIG. 4 shows a flow diagram for secure resource authorization of external identities using remote principal objects, in accordance with an example embodiment.

FIG. 4 will now be described in the context of the foregoing. FIG. 4 shows a flow diagram 400 for secure resource authorization for external identities using remote principal objects, according to example embodiments. System 100A of FIG. 1A, system 100B of FIG. 1B, system 200 of FIG. 2, and system 300 of FIG. 3 operate according to flow diagram 400, in embodiments. Further structural and operational examples will be apparent to persons skilled in the relevant art(s) based on the following descriptions. While components of flow diagram 400 are shown separately for illustration and ease of description, this representation is non-limiting and components are contemplated as being grouped, combined, etc., in any combination or structure. Flow diagram 400 is described as follows with respect to system 200 of FIG. 2 and system 300 of FIG. 3.

In flow diagram 400, various portions of system 200 as described above are represented as performing functions and operations for secure resource authorization for external identities using remote principal objects, with a directory A 468 representing a directory of directories 218 of system 200 for tenant A 226 and/or directory 306 of system 300, and with a directory of directories 218 of system 200 for tenant B/partner 228 ("directory B/P 466" hereinafter) and/or directory 316 of system 300.

Flow diagram 400 begins at step 402 in which a user device 470 associated with tenant A 226 is authenticated to tenant 226. Authentication is performed with user credentials associated with the domain of tenant 226, and in embodiments, is performed via a tenant portal of portals 216. Step 402 is optional in embodiments for which the user of user device 470 authenticates via a different tenant portal (e.g., of tenant B/P 228) or via a system portal, i.e., an alternate portal, of portals 216 related to task creation in step 404, e.g., for a support task related to an identity problem in directory A 468 and requested to tenant B/P 228 as a support service. This alternate portal is configured to authorize the user of user device 470 to a limited space in the domain of tenant B/P 228 for creation of the task, e.g., a support task, based on user-domain credentials from tenant B/P 228, in step 404. That is, the IdP for tenant B/P 228, or for system 200, is configured to recognize the user of user device 470 for the purposes of generating task requests via portals 216. A reply indicating task creation is provided back in step 406.

In step 408, tenant B/P 228 provides a notification for creation of the task to access controller 212 which will generate a task group and ELM packages that define group membership and define permissions required for data resources associated with the task to be accessed by members of the group, according to embodiments. For instance, a set of access packages are predefined in tenant B/P 228 for task performance as permissions templates, having specific versions, in embodiments. These permissions templates may be stored in a template catalog at tenant B/P 228, e.g., in a designated portion of memory 206. When the task is created as described above, in step 410 access controller 212 creates a group, e.g., group 318 in system 300, in directory B/P 466 (of tenant B/P 228) that corresponds to the task and which defines the set of users, or members, who have access to the task. Once this group is created, in step 412 an ELM group package is created in directory B/P 466, by access controller 212, which governs the group membership assignments. This group package includes a custom policy assigned thereto that governs the approval of grants. The custom policy allows for evaluation of rules to approve membership for the group, e.g., the member is the task owner, the member is a case collaborator, the member is a technical advisor in the specified area, etc.

In step 414, access controller 212 retrieves the stored permissions template from tenant B/P 228 and checks in directory A 468 of tenant A 226 for presence of the latest access packages created there (per the permissions template defined) that corresponds to the task. The access packages are created in directory A 468 of tenant A 226 if they do not already exist therein or are refreshed if they are older than the current or latest permissions template version. The access packages include the specific entitlements that are to be assigned to a remote principal, i.e., a group member, for access to data resources associated with the task, in embodiments, e.g., in various forms such as, but not limited to, direct application scope assignments, built-in role assignments, and/or the like. The access packages do not allow custom role assignments, e.g., as such assignments could differ from tenant to tenant and would not guarantee the assigned permissions to be immutable by the task-creating tenant domain. In step 416, access controller 212 creates and assigns an access policy(ies) for the access packages (e.g., the permissions for access to the data resource(s)) stored in directory A 468 from step 414. An access policy represents a set of constraints that are placed on permissions/entitlement grants, e.g., expired in a specified time (number of minutes, hours, days, etc.), manual approval required, approved when incoming principal belongs to a certain group, and/or the like.

As noted herein, permissions and policies governing access to data objects are immutable within the domain that owns the data objects. The owning domain is only permitted to accept or reject the access permissions/policies defined and provided by the remote domain.

In step 418, a user of tenant B/P 228, authenticated therewith via tenant B/P device 472 and/or with domain-specific credentials, opens the task via an application or service of tenant B/P 228. Tenant B/P 228 returns the task details to tenant B/P device 472 in step 420. In embodiments, task details include, without limitation, the type of task, a requesting member of tenant A 226, an ID for tenant A 226 or an associated domain, additional task-specific information, and/or the like. Based on the task details, the user of tenant B/P device 472 requests access to the data resource of tenant A 226 from their own domain (tenant B/P 228), in step 422, via ELM 214. In embodiments, an instance or portion of ELM 214 is allocated to tenant B/P 228 for functions/operations such as this. Accordingly, in step 424, ELM 214 receives a request from tenant B/P 228 for the user of tenant B/P device 472, i.e., as a remote principal with respect to the data resource, to be granted membership to the group associated with the task, as created in step 410 described above. ELM 214 receives the domain credentials of the user/remote principal for tenant B/P 228, and in step 426, provides the credentials and user/remote principal ID to group controller 210 that is configured to determine whether a principal is allowed membership in a group, or is in fact a member of the group, and is allowed access to the data resource in performance of the task. Group controller 210 is configured to verify group membership is present or allowed, and to return a result of the verification to ELM 214. ELM 214 then adds the user/remote principal to the group and notifies tenant B/P 228 in step 428. Verification of group membership allows flow diagram 400 to proceed to step 430, whereas an indication that the user/remote principal is not authorized for group membership will prevent access to the data resource in tenant A 226.

It should be noted that the user/remote principal may already have been granted group membership when the group was created in step 410. In such embodiments, step 424 represents a verification of the group membership for the user/remote principal, and step 428 represents a notification confirming group membership for the user/remote principal.

It should also be noted that functions and operations performed above by access controller 212 may be performed by an instance of access controller 212 designated for, or instantiated in, tenant A 226, and in embodiments where access controller 212 comprises a portion of ELM 214, the functions and operations described above for flow diagram 400 regarding access controller 212 may be performed by an instance of ELM 214 designated for, or instantiated in, tenant B/P 228. It should also be noted that functions and operations performed below by ELM 214 may be performed by an instance of ELM 214 designated for, or instantiated in, tenant A 226.

In step 430, a request is provided on behalf of the user/remote principal from tenant B/P 228 to ELM 214 for data resource access approval, e.g., via approval of data access packages with permissions and of policies created in step 414 and step 416. In embodiments, ELM 214 then provides a request for access package/permissions approval to lockbox 222 associated with tenant A 226 in step 432. Lockbox 222 is a secure application by which a user of tenant A 226 is notified via a UI at tenant A device 473 of the request, in step 434, and is enabled to accept or reject this request. The notification identifies the task, the permissions, the access policy, and/or the group, in embodiments. However, in some embodiments, the notification does not identify specific remote principals, i.e., individual members, of the group, thus protecting their identities. In step 436, a result for the request of step 434 is provided back to ELM 214 from lockbox 222. If the request for access package/permissions approval is not granted, access to the data resource for performance of task will be denied. If approval is granted, access to the data resource will be permitted according to the permissions and access policy. In embodiments, ad-hoc implementations are also contemplated herein in which access governance is not as strictly managed as is described for flow diagram 400 and ELM 214. For example, a data resource owner of a first domain may provide access to the data resource, in the first domain, to members of a group in second domain without requiring approval actions to be taken when members are added or removed from the group in the second domain. In such scenarios, the access permissions are granted to the group by the data resource owner, while membership of the group may be entirely managed within the second domain without any additional approval required. In the context of flow diagram 400, approval for group access to a data resource may be performed similarly as described for step 430 and step 432, or may be previously performed at an earlier point in the process, such as via a pre-approval for group access, e.g., during task creation as described above, and/or the like. In other words, the governance of access to data resources is contemplated for embodiments herein as being strict, relaxed, and/or any other tolerance/combination of ad-hoc implementations, as would be understood by persons of skill in the relevant art(s) having the benefit of this disclosure, and are not limited by the described or illustrated embodiments.

In step 438, and upon approval returned in step 436, ELM 214 creates an RPO, as described herein, e.g., in FIG. 3, in directory A 468 of tenant A 226. The created RPO is generated based on the permissions and access policy created in step 414 and step 416 and approved in step 434. In embodiments, ELM 214 causes the creation of the RPO in director A 468. In step 440, tenant B/P 228 receives the result of the request for data access approval, and in step 442, a corresponding notification is provided to the user/remote principal at tenant B/P device 472. Accordingly, the user/remote principal at tenant B/P device 472 is informed that access to the data resource associated with the task has been granted, and the user/remote principal is enabled to proceed with accessing the data resource.

In step 444, the user/remote principal at tenant B/P device 472 opens a UI portal of tenant A 226 (e.g., one of portals 216), e.g., via a domain name or website associated with tenant A 226. This tenant portal prompts the acquisition of an access token from STS 232 in step 446, either by recognizing that the user/remote principal has external credentials, or by standard login procedure. In embodiments, an instance of STS 232 associated with tenant B/P 228 may be designated for token issuance here if trusted by tenant A 226, and the remote principal may be authenticated based on their own domain credentials for initial access to tenant A 226, but not yet to access the secure data resource of tenant A 226. Tenant B/P device 472 then provides a request for the access token to STS 232 in step 448. In embodiments, an instance of STS 232 associated with tenant A 226 may be designated for receiving the request in step 448. In step 450, STS 232 directs the tenant portal to provide a login challenge to tenant B/P device 472 responsive to the request for the access token in step 448. Next in step 452, the external domain credentials of the user/remote principal (i.e., for tenant B/P 228) are provided against the login challenge from tenant B/P device 472, via the portal, to STS 232 for access to tenant A 226. It is contemplated herein that aspects of secure resource authorization for external identities using remote principal objects are also implemented along with other access methods/models, according to embodiments. For instance, scenarios are contemplated in which a remote principal is a member of a group for access to a data resource(s) of a given domain via RPOs, as described herein, and is also a guest user for that same given domain. In other words, it should be understood that utilizing RPOs is not exclusive of other access methods/models also being implemented. Further non-limiting details regarding an example of this scenario are described below with respect to FIG. 5.

As shown in step 454, STS 232 performs a lookup in directory A 468 of tenant A 226. As noted above, types of access methods/models other than those described for RPOs may be performed, in embodiments, such as but not limited to guest access, etc., as described for FIG. 5 below. The lookup shown in step 454 exemplarily illustrates a scenario in which RPOs are utilized and includes identifying one or more RPOs in directory A 468 that point to the domain ID with which the user/remote principal is associated, e.g., the RPO created in step 438, and the result of the lookup is returned to STS 232. If no RPOs that fulfil these requirements are found, then the authentication fails, and no token is issued. In embodiments, one or more RPOs pointing to tenant B/P 228 with which the user/remote principal is associated are stored in directory A 468. When more than one RPO is having the requisite criteria is found, an additional match criterion is used for selecting the RPOs, e.g., RPOs with type "group" are validated if it is determined that the user/remote principal is a member of the group in the domain of tenant B/P 228. If no RPOs are selected with the match criteria, then the authentication fails, and no token is issued.

If at least one RPO is selected, in step 456, STS 232 retrieves the entitlements specified in the RPO(s) stored in directory A 468 which point to tenant B/P 228 and designate the user/remote principal as a group member. As an example, for each RPO that is selected, STS 232 queries all the links between the RPO and the data resource for which the token is requested. In embodiments, there is one link per RPO and data resource combination with all the scopes that are to be included in the token for that data resource. The entitlements are based on the permissions and access policy associated with the RPO(s), as described above with respect to RPO 308 of FIG. 3, according to embodiments. As an example, a service/application ID and a claim(s) comprise entitlements associated with an RPO. In step 458, the entitlements are returned to STS 232.

In step 460, STS 232 generates an access token for the portal of tenant A 226 and provides the access token to tenant B/P device 472 for user/remote principal to satisfy either the login challenge for the portal described in step 452, or to provide the remote principal with claims to access the secure data resources of tenant A 226. In embodiments, the access token includes the entitlements returned in step 458, where STS 232 has combined all the scopes found in the links between the selected RPO(s) and the data resource to enumerate the entitlements, and specifies a redirect for the browser utilized by tenant B/P device 472 to interface with the portal. In step 462, the browser at tenant B/P device 472 provides the redirect information with the token and entitlements/permissions to the portal. The portal of portal(s) 216 may be configured to authenticate the user/remote principal according to the token for the entitlements/permissions, or may be configured to provide access to the sought secure data resource via the redirect. In step 464, the portal provides access to the data resource, based on the entitlements/permissions, and completes the redirect for the browser at tenant B/P device 472 for data resource access in performance of the task.

In different embodiments, as noted herein, an application or service may act as a remote principal instead of a user remote principal. In such embodiments, an interface, such as an API, is used by the application/service remote principal instead of the UI for the user remote principal.

Accordingly, the user/remote principal at tenant B/P device 472 is enabled to access secure data resources of tenant A 226 using their domain credentials for tenant B/P 228. It should also be noted that token exchange is used for validation of the user/remote principal, in embodiments, instead of credential validation as described above in flow diagram 400.

Figure 5:
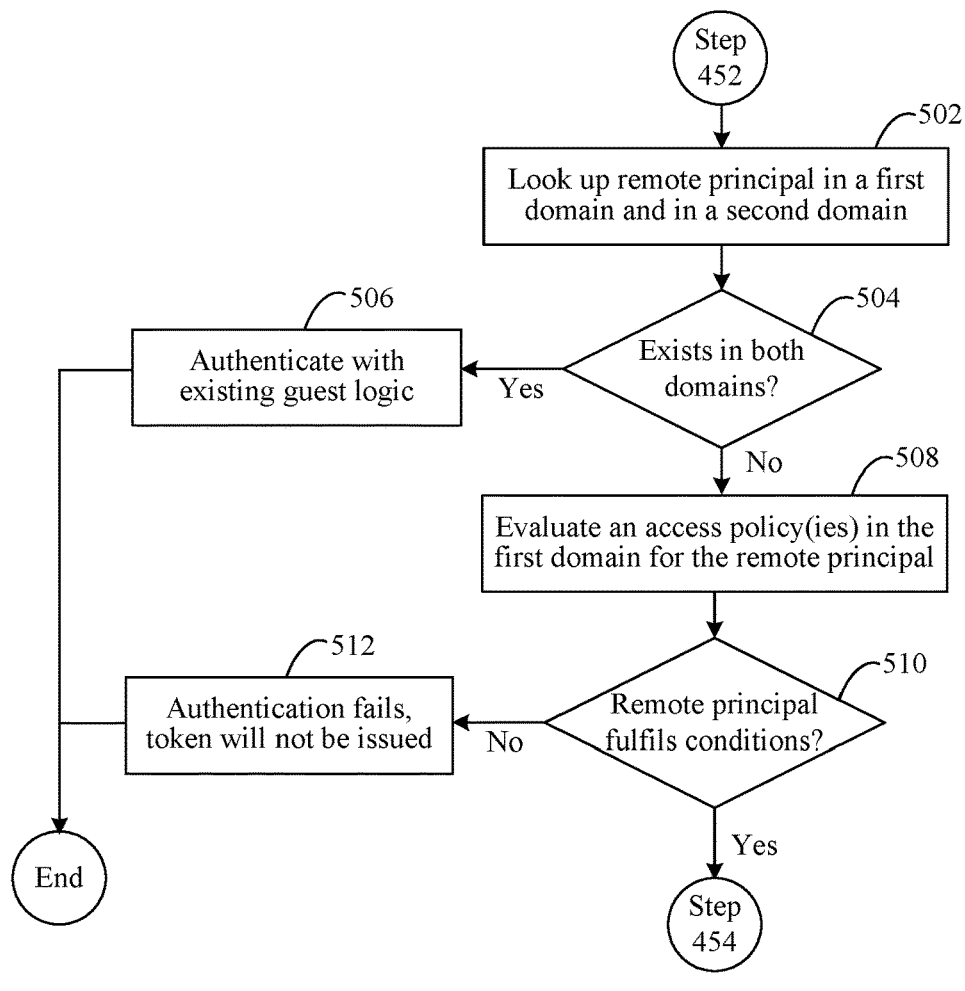
FIG. 5 shows a flowchart of an embodiment of the flow diagram of FIG. 4 for secure resource authorization of external identities using remote principal objects, in accordance with an example embodiment.

In embodiments, STS 232 of FIGS. 2 and 3 is configured to perform additional functions and/or operations for token issuance to the user/remote principal as described above. For instance, FIG. 5 shows a flowchart 500 of an embodiment of flow diagram 400 of FIG. 4 for secure resource authorization of external identities using remote principal objects, in accordance with an example embodiment. Further structural and operational examples will be apparent to persons skilled in the relevant art(s) based on the following descriptions. Flowchart 500 is described as follows with respect to system 200 of FIG. 2 and system 300 of FIG. 3, as well as flow diagram 400 of FIG. 4.

In embodiments, flowchart 500 begins subsequent to step 452 of flow diagram 400. For example, in response to receiving the external domain credentials in step 452, STS 232 is configured to perform a lookup for the user/remote principal in a first domain and in a second domain, in step 502 of flowchart 500. With respect to flow diagram 400, STS 232 is configured to look up the identity of the user/remote principal in both the external domain, e.g., directory B/P 466 of tenant B/P 228, and in the domain of the data resource owner, e.g., directory A 468 of tenant A 226.

In step 504, if the identity of the user/remote principal is found by STS 232 to exist in both domains, in step 506 the token issuance follows existing logic to authenticate the user/remote principal according to a guest model, or other similar model, without authentication via an RPO, and flowchart 500 ends. If the identity of the user/remote principal is not found in both domains according to step 504, flowchart 500 continues to step 508 in which a selected set of conditional access policies in the domain of tenant B/P 228 are evaluated by STS 232. In embodiments, the conditional access policies correspond to the task created in flow diagram 400. In step 510, it is determined if the user/remote principal fulfils the conditions. If the user/remote principal fails to fulfil the conditions in step 510, then the authentication fails and the token is not issued according to step 512, and flowchart 500 ends; otherwise the authentication process proceeds to step 454 of flow diagram 400.

In embodiments, the authentication using RPOs may take precedence over the use of other models and/or mechanisms. In the context of flowchart 500, step 508 and step 510 are preformed prior to step 502 and step 504, according to such embodiments, where a remote principal not fulfilling conditions in step 510 leads to performance of step 502. Additionally, while not shown for brevity and ease of illustration, other models and/or mechanisms for authentication may be determined and/or used at different points in flowchart 500.

Turning now to FIG. 6, an example token 600 for secure resource authorization of external identities using remote principal objects is shown, in accordance with an example embodiment. Token 600 corresponds to the token generated by STS 232 in step 460 of flow diagram 400, in embodiments. Token 600 is illustrative and exemplary in nature, and is to be considered non-limiting. For token 600, the example data resource for which access is sought by the user/remote principal, e.g., of tenant B/P 228 (as a partner), is a directory, e.g., directory A 468 of tenant A 226 (as a customer) in FIG. 4.

In embodiments, token 600 issued by STS 232 is required to not divulge the real identity, or identifying information, of the user/remote principal from the domain of the user/remote principal, e.g., a member of group 318 of second domain 304 in FIG. 3 and/or the user/remote principal of tenant B/P 238 as illustrated in and described with respect to flow diagram 400 of FIG. 4. Accordingly, in embodiments, attributes such as but not limited to the following are not populated: "family_name", "given_name", "name", "oid", "onprem_sid", "puid", "unique_name", "upn", "deviceid", etc. In some embodiments, claims which refer to conditional access policies and multi-factor authentication (MFA) "auth-.state" are also not populated: e.g., "amr", "controls", "signin_tate", etc. However, in some embodiments, one or more portions of identifying information may be included in tokens based on an agreement therefor between data resource owners and accessors. Additionally, an attribute designating that a remote principal is specified in token 600, e.g., "rpo," is included with token 600 that points to the RPO from which token 600 is created, in embodiments. This is used to correlate token 600 to the RPO(s) and through that to the ELM package that created the RPO. This example "rpo" claim is optional in some embodiments, and may only be provided for services/applications that subscribe to this claim. The "rpo" claim contains the RPO object ID in the customer tenant. In some embodiments, when workloads require additional information in the token for various purposes such as granular and compliance auditing, etc., the data resource owner and the partner/remote principal can mutually agree for additional information to be available in the token, such as partner user "oid", partner user "upn", etc.

In token embodiments, the issuer and domain ID are the data resource owner domain, the IdP corresponds to the host domain, "altsecid" is not specified, and an RPO ID is specified. Additionally, embodiments provide for "wids" claims for tokens generated in association with RPOs. In embodiments, a well-known globally unique identifier (GUID) is used for the "wids" claims. For example, if the token issued is for a remote principal, then the "wids" claim may contain a well-known RPO GUID (e.g. 00000000-900d-f00d-0000-000000000000) that represents the remote principal. It should be noted that this GUID is exemplary in nature, for descriptive purposes, and the actual GUID chosen at the implementation time maybe different, according to embodiments. The "wids" claim may also contain the directory roles assigned to the RPO. In such cases, the workloads are advised to use this scope to determine any built-in directory roles assigned to the RPO. Furthermore, the workloads may perform their own mapping of directory built-in roles to a set of permissions understood by the workloads.

The scopes stamped in issued token 600 are based on the set of associated links between the RPO and the data resource for which token 600 is requested. As noted above, the links between the RPO and the data resource(s) are created by ELM 214 (as in FIGS. 2 and 4) based on the permissions and access policy, e.g., in an access package definition, that govern access to a secure data resource. The scope of the task (e.g., the task topic) determines the data resource access needs and thus defines the contents of the access package, according to embodiments. An access package definition for a given scope of a task is predefined in embodiments, e.g., via permissions templates, in the domain of the user/remote principal, and cannot be changed in the domain of the data resource owner, in embodiments, and similarly, the links created for the RPO are not editable in any way process other than via the access packages. Through this process, the claims granted to the user/remote principal through the RPO are immutable with respect to the domain of the data resource owner.

In the context of workload tasks, workloads are also enabled to use the scopes described herein to authorize requests. Existing group membership or custom role membership checks for authorization are not able to be used, in embodiments, because such assignments are not made to the RPO stored in the directory of the domain of the data resource owner. It is contemplated herein that built-in role membership checks may still be performed, however, in the described embodiments, the use of service/application scopes via RPOs is more robust and extensible for authorizations managed within a directory of a domain.

In embodiments, the telemetry processing pipeline of STS 232 that generates token 600 incorporates the RPO modeling/requirements noted herein, and is configured to emit sign-in logs or audit reports in both the domain of the user/remote principal and the domain of the data resource owner. As similarly noted above for token generation in flow diagram 400, embodiments provide for the logs/audit reports provided to the domain of the data resource owner to be exclusive of any user-/remote principal-specific information, while the logs/audit reports that are emitted into the domain of the user/remote principal are permitted to include the actual user/remote principal information. In other embodiments, however, portions of principal-specific/identifying information may be included in logs/audit reports based on an agreement therefor between data resource owners and accessors.

Accessing secure data resources, such as directory data, via remote principals is a sensitive operation. Because there are at least two different organizations involved in setting up the access controls, and one organization obtaining the ability to read data of another organization, embodiments herein provide for the sign-in/authentication and all task activity, which are important data for audits, to be tracked to prevent abuse and further reduce the risk of using the described embodiments for conducting tasks and operations on data resources.

Additionally, if issues arise during the performance of a task, the owners of data resources on which tasks are performed are enabled to determine specific information regarding the task performance in order track and/or resolve issues via logs/audit reports without being required to maintain a list of group members from a remote domain that have access to the data resource. That is, in some scenarios, the data resource owner may not want to include remote domain users in its directory, of which there may be many in embodiments, because maintaining lists of remote domain users requires additional memory and processing usage, additional administration/overhead, and remote domain user access may only be required for a limited period of time (e.g., to perform a task related to the data resource). Furthermore, the group membership list for access to a data resource for performing a task may include many more members than will actually participate in task performance. As an example, a group can include ten members who are granted access to a data resource, but only a single member may be involved to complete a given task associated with the data resource. Over time, considering that different tasks may also have different corresponding groups with different memberships, a large number of remote domain users, many of which never accessed a data resource in performance of a task, could be maintained by the domain of the data resource owner. The described RPO embodiments, however, allow for the transient access permissions associated with RPOs to have little persisting impact on the domain of the resource owner as the lists of remote domain users are not required to be persisted.

Regarding sign-in/authentication activity, when a user/remote principal signs-in to the data resource owner domain from their own domain, the owner should know that a sign-in occurred and a token was issued to a data resource in their domain. The specific identity of the remote principal that was authentication, as well as their geographic location, are private with respect to the remote principal's domain and are thus not shared with the data resource owner, in embodiments. The service provider should know that one of their users signed-in to the customer tenant. The remote principal's domain however, is provided complete details of the sign-in/authentication for tasks and access to data resources, including who, when, from where, and/or the like.

Regarding activity audits, each activity performed (including reads) through the tokens issued to remote principals are tracked and made available to the data resource owner's domain, in embodiments. The audits of write activities made available to the data resource owner's domain include the RPO identifier and then token identifier instead of the actual user/remote principal identity.

Figure 7:
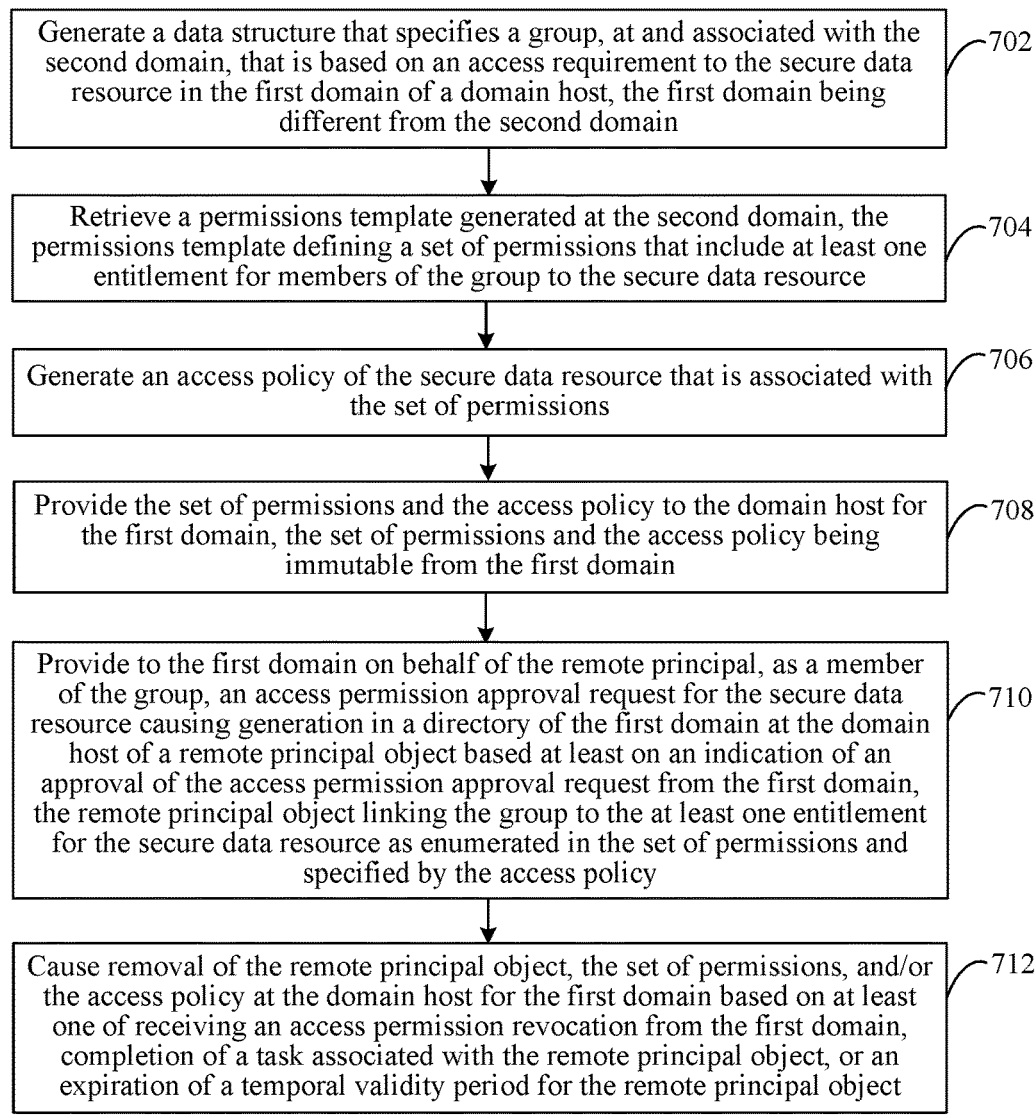
FIG. 7 shows a flowchart for secure resource authorization of external identities using remote principal objects, in accordance with an example embodiment.
Figure 8:
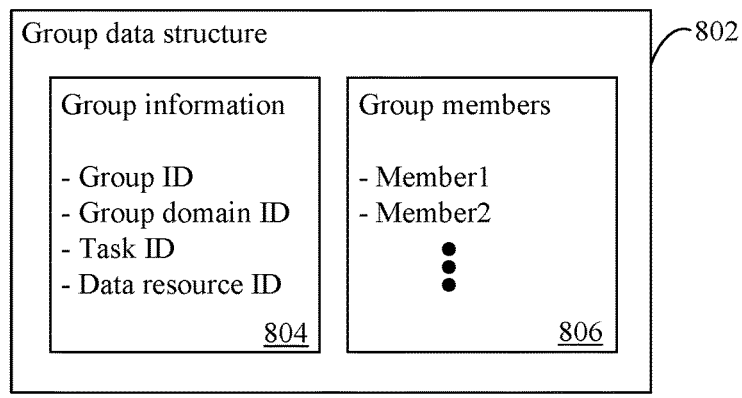
FIG. 8 shows a group as a data structure utilized for secure resource authorization for external identities using remote principal objects, in accordance with an example embodiment.
Figure 9:
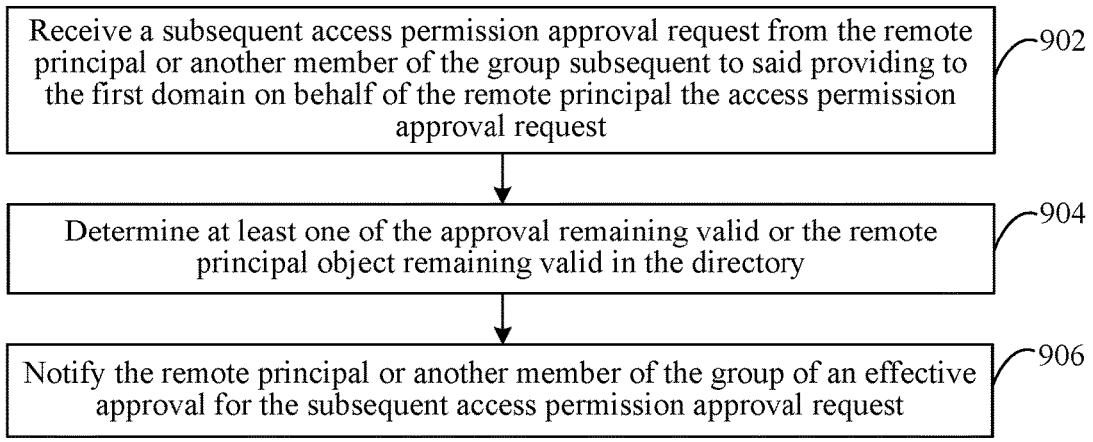
FIG. 9 shows a flowchart for secure resource authorization of external identities using remote principal objects, in accordance with an example embodiment.

Systems and devices are configured in various ways to perform secure resource authorization for external identities using remote principal objects—in this context, FIGS. 7, 8, and 9 are now described.

For example, FIG. 7 shows a flowchart 700 for secure resource authorization for external identities using remote principal objects, according to example embodiments. System 100A in FIG. 1A, system 100B in FIG. 1B, system 200 in FIG. 2, and system 300 of FIG. 3 may operate according to flowchart 700, in embodiments. Further structural and operational examples will be apparent to persons skilled in the relevant art(s) based on the following descriptions. Flowchart 700 may be an embodiment of flow diagram 400 of FIG. 4. Flowchart 700 is described below with respect to system 200 of FIG. 2 and system 300 of FIG. 3.

FIG. 8 shows a group 800 as a data structure utilized for secure resource authorization for external identities using remote principal objects, according to example embodiments. Group 800 is an example of an embodiment of group 318 in system 300 of FIG. 3. Group 800 is organized as an exemplary data structure that is generated and stored into a memory, in embodiments, such as memory 206 of system 200 and inclusive of directories described herein.

Referring back to FIG. 7, flowchart 700 begins at step 702. In step 702, a data structure that specifies a group is generated, at and associated with the second domain, that is based on an access requirement to the secure data resource in the first domain of a domain host, the first domain being different from the second domain. For instance, access controller 212 of system 200 in FIG. 2 is configured to generate a data structure that specifies a group of tenant B/P 228, as shown in step 410 of flow diagram 400 in FIG. 4. In embodiments, the data structure/group is generated responsive, or subsequent, to receiving an indication or request to create a task that is associated with the secure data resource.

Turning now to FIG. 8, group 800 includes a data structure 802. Data structure 802 is organized in any manner to represent a group of members, such as users/remote principals for whom access to a data resource is sought in performance of a task, according to embodiments. As non-limiting examples, a data structure for a group may include lists, sets, fields, tables, and/or the like. As illustrated, data structure 802 includes a set or list of group information 804 and a set or list of group members 806. With reference to flow diagram 400 of FIG. 4, group 800, as data structure 802, is stored in directory B/P 466 for tenant B/P 228.

Group information 804 includes one or more of a group ID that identifies the group, a group domain ID that identifies the domain associated with the group, a task ID that identifies the task associated with the data resource, and a data resource ID that identifies the data resource itself. In embodiments, more or fewer of the listed information entries illustrated for group information 804 may be included.

Group members 806 includes a first group member with identifier "Member1" and a second group member with identifier "Member2," although more or fewer of the listed member entries illustrated for group members 806 may be included, in addition to an empty set of members, in embodiments. Each entry of group members 806 may include an identifier as a member name, an alias, and/or any other type of identifier. As shown, group members 806 is a set or list of members, e.g., users/remote principals of a domain for which access to a data resource of another domain is sought in performance of a task. Additional information associated with entries of group members 806 is also contemplated herein, such as but not limited to, credential information, member roles, and/or the like, in embodiments. As noted above, group members include applications and/or services, according to embodiments.

Referring again to FIG. 7, in step 704, a permissions template generated at the second domain is retrieved, the permissions template defining a set of permissions that include at least one entitlement for members of the group to the secure data resource. For example, access controller 212 is configured to retrieve permissions templates, as described herein, generated and/or stored at tenant B/P 228, e.g., in memory 206 of system 200. Permissions templates define the permissions for entitlements that group members are granted for a secure data resource associate with performing a task. In embodiments, access packages, as described herein, comprise the permission for the entitlements.

In step 706, an access policy of the secure data resource is generated that is associated with the set of permissions. For instance, access controller 212 is configured to generate access policies of secure data resources that define which users/remote principals are allowed access to the secure data resource, as required for the performance of a given task, through a group membership check of the users/remote principals. In some embodiments, the access policy is generated based the permissions template that is retrieved in step 704 described above. In embodiments, the access policy allows for automatic approval of the requests to access secure data resources, if such requests are made by the users/remote principals from the domain (e.g., tenant B/P 228) who belong to the designated group corresponding to the task. The described embodiments allow for this evaluation to be performed for the first requestor without later evaluations for subsequent requests.

In step 708, the set of permissions and the access policy are provided to the domain host for the first domain, the set of permissions and the access policy being immutable from the first domain. For example, in the context of flow diagram 400, access controller 212 is configured to provide the set of permissions and the access policy to directory A 468 of tenant A 226 for storage therein, where the access policy is associated with the permissions. In embodiments, the permissions comprise access packages as described herein, which are provided to the first domain. As previously noted, access packages/permissions and access policies, while stored at the domains of secure data resource owners, are immutable from such domains.

In step 710, an access permission approval request for the secure data resource is provided to the first domain on behalf of the remote principal, as a member of the group, causing generation in a directory of the first domain at the domain host of a remote principal object based at least on an indication of an approval of the access permission approval request from the first domain, the remote principal object linking the group to the at least one entitlement for the secure data resource as enumerated in the set of permissions and specified by the access policy. For instance, a secure data resource owner or representative (e.g., an authorized member of the domain for tenant A 226) approves access permission to the secure data resource based on the permissions and the access policy provided in step 708 (e.g., via lock box 222 of system 200) from ELM 214 on behalf of a user/remote principal of tenant B/P 228. When an indication of the approval is received by ELM 214, ELM 214 is configured to cause the creation/generation of an RPO in directory A 468. As described herein, such as with respect to RPO 308 of system 300 in FIG. 3, the RPO includes links to group for entitles to a secure data resource(s) based on the access packages/permissions and/or access policy provided by ELM 214. The RPO is stored in directory A 468 against an access attempt by a user/remote principal of the group from tenant B/P 228.

In step 712, removal of the remote principal object, the set of permissions, and/or the access policy at the domain host for the first domain is caused based on at least one of receiving an access permission revocation from the first domain, completion of a task associated with the remote principal object, or an expiration of a temporal validity period for the remote principal object. For example, ELM 214 of system 200 is configured to remove, or cause removal of, an RPO, associated access packages/permissions, and/or associated access policies from a directory in a domain of a secure data resource owner, in embodiments. ELM 214 is configured to perform such removal/clean up/deletion based on a variety of conditions, such as but without limitation, the rejection or revocation of access permissions from the domain of the secure data resource owner, the completion of the task corresponding to the creation of the RPO, and/or expiration of the RPO and/or its permissions which are defined an associated access policy.

In FIG. 9, a flowchart 900 for secure resource authorization for external identities using remote principal objects is shown, according to example embodiments. System 100A in FIG. 1A, system 100B in FIG. 1B, system 200 in FIG. 2, and system 300 of FIG. 3 may operate according to flowchart 900, in embodiments. Further structural and operational examples will be apparent to persons skilled in the relevant art(s) based on the following descriptions. Flowchart 900 may be an embodiment of flowchart 700 in FIG. 7. Flowchart 900 is described below with respect to system 200 of FIG. 2 and system 300 of FIG. 3.

Flowchart 900 begins at step 902. In step 902, a subsequent access permission approval request is received from the remote principal or another member of the group subsequent to said providing to the first domain on behalf of the remote principal the access permission approval request. For instance, after step 710 of flowchart 700 in which a first access permission approval request is provided to the first domain, and is approved, causing an RPO and its links to be generated in the directory of the first domain, a later or subsequent access permission approval request is received from the same remote principal or another member/remote principal of the group associated with the RPO. In embodiments, step 902 is a later re-performance of step 430 of flow diagram 400 in FIG. 4 by the same or another remote principal of the group. When the request of first remote principal is validated and approved, the RPO and its "links" are be created in the directory of the domain of the data resource owner, and therefore, subsequent requests for access are treated as "no-ops" in embodiments where the lifecycle of the RPO remains valid, or will cause the re-creation of the RPO if it was cleaned up due to expiry of the lifecycle.

In step 904, at least one of the approval remaining valid or the remote principal object remaining valid in the directory is determined. For example, the access policy generated by ELM 214 of system 200 governs the lifecycle of the provided permissions/access package and the associated RPO in the directory in the domain of the data resource owner. ELM is configured to monitor and/or be notified about the lifecycle validity for permissions/access packages and their associated RPOs in data resource owner directories. Because the access policy created by the ELM strictly governs the lifecycle, the continued existence of the RPO in the directory is evidence of the lifecycle, and thus the RPO, remaining valid. Similarly, a revocation of the granted access to the data resource from the domain of its owner causes ELM 214 to clean up the RPO and associated access packages/permissions and access policies. Accordingly, in the absence of a revocation and with the RPO remaining valid in the directory per the access policy, the determination in step 904 is accomplished.

In step 906, the remote principal or another member of the group is notified of an effective approval for the subsequent access permission approval request. For instance, as noted herein, the access policy created for the permissions/access package used to generated an RPO allow for automatic approval of requests for access to data resources with an evaluation of the first access request received, while subsequent requests are considered "no-ops." Therefore, ELM 214 is configured to notify the remote principal or the other member of the group of this effective approval, i.e., the automatic approval, for data resource access, in embodiments, and step 906 is a later re-performance of step 442 of flow diagram 400 in FIG. 4 without preceding steps back until step 430 having to be performed. That is, because the RPO for data resource access by the group of the remote principal and the other remote principal already exists, and remains valid, in the directory of the data resource owner domain, access to the data resource is obtained via step 444 of flow diagram 400 and the steps that follow.

Figure 10:
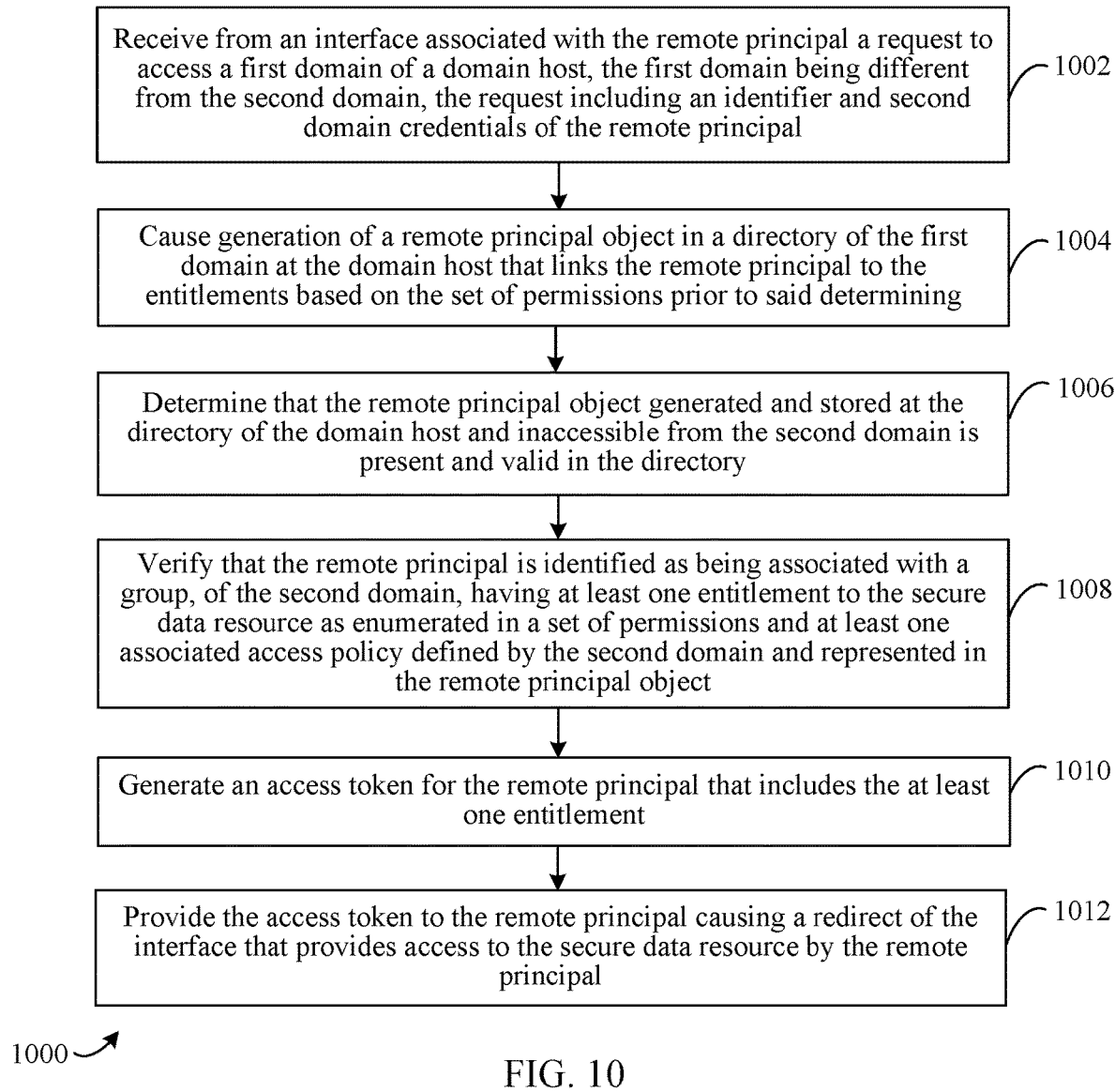
FIG. 10 shows a flowchart for secure resource authorization of external identities using remote principal objects, in accordance with an example embodiment.

In FIG. 10, a flowchart 1000 for secure resource authorization for external identities using remote principal objects is shown, according to example embodiments. System 100A in FIG. 1A, system 100B in FIG. 1B, system 200 in FIG. 2, and system 300 of FIG. 3 may operate according to flowchart 1000, in embodiments. Further structural and operational examples will be apparent to persons skilled in the relevant art(s) based on the following descriptions. Flowchart 1000 may be an embodiment of flow diagram 400 of FIG. 4 and/or flow diagram 500 of FIG. 5. Flowchart 1000 is described below with respect to system 200 of FIG. 2 and system 300 of FIG. 3.

Flowchart 1000 begins at step 1002. In step 1002, a request to access a first domain of a domain host is received from an interface associated with the remote principal, the first domain being different from the second domain, the request including an identifier and second domain credentials of the remote principal. For example, a request from the remote principal is received by ELM 214, via tenant B/P 228, for access to a secure data resource of tenant A 226 for performance of a task, as similarly described for step 422 and step 430 of flow diagram 400 in FIG. 4. In embodiments, the first domain and the second domain are different and each respectively require specific credentials for access thereto—that is, credentials to access the first domain will not provide access to a data resource securely stored in the second domain. The remote principal of tenant B/P 228 has credentials therefor, and these credentials, inclusive of an identifier, are provided in the request of step 1002 to ELM 214 for group membership validation against an RPO.

In step 1004, generation of a remote principal object in a directory of the first domain at the domain host is caused that links the remote principal to the entitlements based on the set of permissions. For instance, ELM 214 is configured to generate, or cause generation of, an RPO in directory A 468 of tenant A 226 subsequent to the request received in step 1002, as similarly described for step 422 and step 430 of flow diagram 400 in FIG. 4. The generated RPO is created based on permissions in an access package provided to directory A 468 from ELM 214.

In step 1006, it is determined that the remote principal object generated and stored at the directory of the domain host and inaccessible from the second domain is present and valid in the directory. For example, the RPO generated in step 1004 at directory A 468 has a lifecycle associated therewith, thus a determination of its presence and validity is performed by STS 232 of system 200 in FIG. 2 and in FIG. 4 subsequent to its creation. STS 232 is also configured to determine if the RPO has a "group" type in order to validate the remote principal against the group specified.

In step 1008, it is verified that the remote principal is identified as being associated with a group, of the second domain, having at least one entitlement to the secure data resource as enumerated in a set of permissions and at least one associated access policy defined by the second domain and represented in the remote principal object. For instance, the RPO generated in step 1004 at directory A 468 includes a list or set of group members authorized to access a data resource associated with the task, and STS 232 of system 200 in FIG. 2 and in FIG. 4 is configured to determine if the remote principal is a member of the group (as similarly determined in step 454 of flow diagram 400). In embodiments, the identity of the remote principal is based on credentials provided which are verified against the group linked in the RPO at directory A 468. In embodiments, the identity of the remote principal is based on credentials provided which are verified against the group linked in the RPO at directory A 468.

In step 1010, an access token is generated for the remote principal that includes the at least one entitlement. For example, STS 232 is configured to generate the access token for the remote principal. The access token includes the entitlement(s) derived from the permissions on which the RPO is generated. In embodiments, the token also specifies a redirect for a UI used by the remote principal. Step 1010 may be an embodiment of step 458 and step 460 of flow diagram 400 in FIG. 4.

In step 1012, the access token is provided to the remote principal causing a redirect of the interface that provides access to the secure data resource by the remote principal. For instance, STS 232 is configured to provide the access token generated in step 1010 to the device of the remote principal. When the access token includes the redirect described above, provision of the access token to the remote principal causes a redirect of the UI on the remote principal's device, which in turn allows for access by the remote principal to the secure data resource associated with the task. Step 1012 may be an embodiment of step 460 of flow diagram 400 in FIG. 4.

As noted herein, according to embodiments, the UI described for the remote principal in flowchart 1000 may be an API in implementations for which the remote principal is an application or a service.

Figure 11:
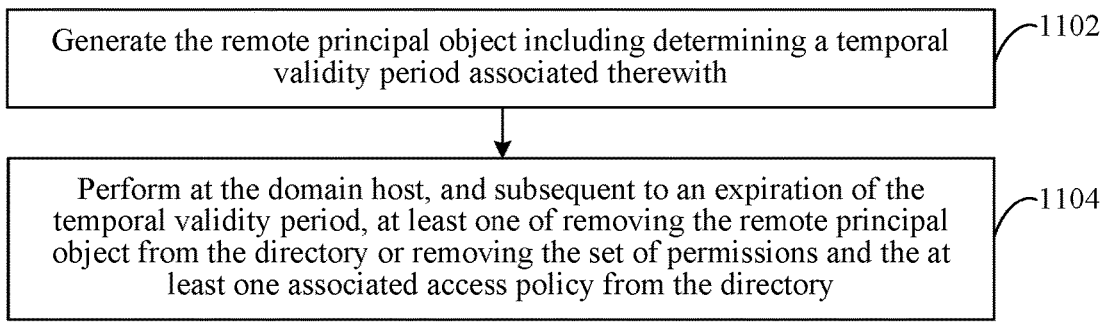
FIG. 11 shows a flowchart for secure resource authorization of external identities using remote principal objects, in accordance with an example embodiment.

In FIG. 11, a flowchart 1100 for secure resource authorization for external identities using remote principal objects is shown, according to example embodiments. System 100A in FIG. 1A, system 100B in FIG. 1B, system 200 in FIG. 2, and system 300 of FIG. 3 may operate according to flowchart 1100, in embodiments. Further structural and operational examples will be apparent to persons skilled in the relevant art(s) based on the following descriptions. Flowchart 1100 may be an embodiment of flowchart 1000 in FIG. 10. Flowchart 1100 is described below with respect to system 200 of FIG. 2 and system 300 of FIG. 3.

Flowchart 1100 begins at step 1102. In step 1102, the generation of the remote principal object is performed to include determining a temporal validity period associated therewith. Step 1102 is an embodiment of step 1004 of flowchart 1000 in FIG. 10. For instance, as noted herein, RPOs, permissions, and group memberships include lifecycle limitations, in embodiments, where this lifecycle is strictly governed by the access policy for the permissions generated by ELM 214 of system 200 in FIG. 2. In step 1102, ELM 214 determines the lifecycle of the RPO and its permissions as a temporal validity period based on the access policy created. Accordingly, when the expiration of the lifecycle is determined, flowchart 1000 does not proceed to step 1008 from step 1006 at least because the RPO in the directory of the data resource owner is no longer valid.

In step 1104, at least one of removing the remote principal object from the directory or removing the set of permissions and the at least one associated access policy from the directory is performed at the domain host, and subsequent to an expiration of the temporal validity period. For example, ELM 214 is configured to remove the RPO from the directory and/or remove the set of permissions and the at least one associated access policy based on the expiration of the lifecycle. Additionally ELM 214 is also configured to remove remote principals from the group associated with the task and the RPO, in embodiments. It is also contemplated herein that the lifecycles described become expired upon completion of the task.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A in FIG. 1A, system 100B in FIG. 1B, system 200 in FIG. 2, system 300 of FIG. 3, and group 800 of FIG. 8, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 12:
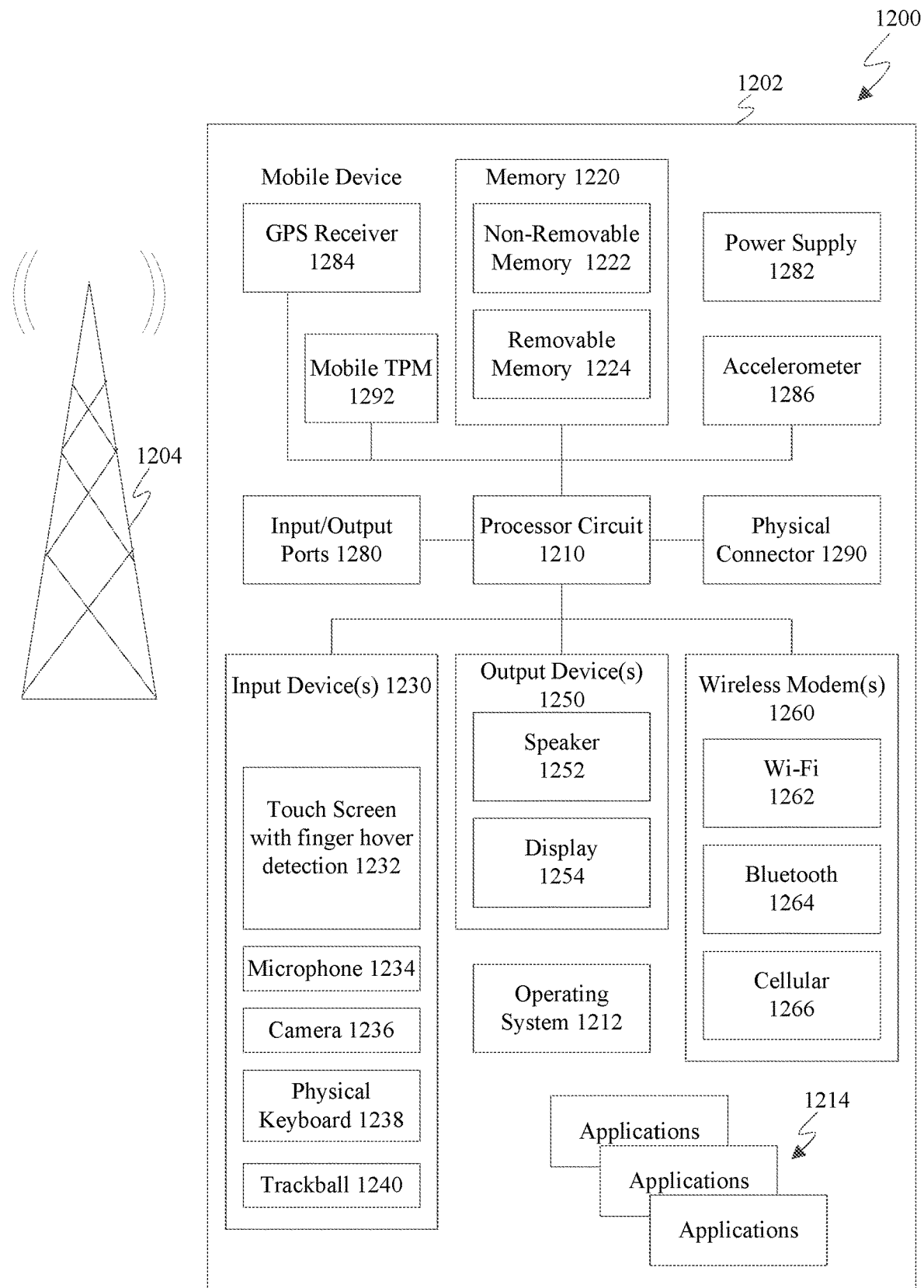
FIG. 12 shows a block diagram of an example mobile device that may be used to implement embodiments.

FIG. 12 is a block diagram of an exemplary mobile system 1200 that includes a mobile device 1202 that may implement embodiments described herein. For example, mobile device 1202 may be used to implement any system, client, or device, or components/subcomponents thereof, in the preceding sections. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

Mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., e-mail applications, calendars, contact managers, web browsers, messaging applications) and any other computing applications (e.g., word processing applications, mapping applications, media player applications).

Mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and application programs 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing one or more of system 100A in FIG. 1A, system 100B in FIG. 1B, system 200 in FIG. 2, system 300 of FIG. 3, and group 800 of FIG. 8, along with any components and/or subcomponents thereof, as well as the flowcharts/flow diagrams described herein, including portions thereof, and/or further examples described herein.

Mobile device 1202 can include a mobile TPM 1292. Mobile TPM 1292 may be a mobile device equivalent embodiment of a TPM, as would be understood by one of skill in the relevant art(s) having the benefit of this disclosure. For example, mobile TPM 1292 may be configured to perform one or more functions or operations of TPMs for various embodiments herein.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. Input devices 1230 can include a Natural User Interface (NUI).

One or more wireless modems 1260 can be coupled to antenna(s) (not shown) and can support two-way communications between processor 1210 and external devices, as is well understood in the art. Modem 1260 is shown generically and can include a cellular modem 1266 for communicating with the mobile communication network 1204 and/or other radio-based modems (e.g., Bluetooth 1264 and/or Wi-Fi 1262). At least one wireless modem 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to implement any of the above-described features of flowcharts herein. Computer program logic for performing any of the operations, steps, and/or functions described herein may be stored in memory 1220 and executed by processor 1210.

Figure 13:
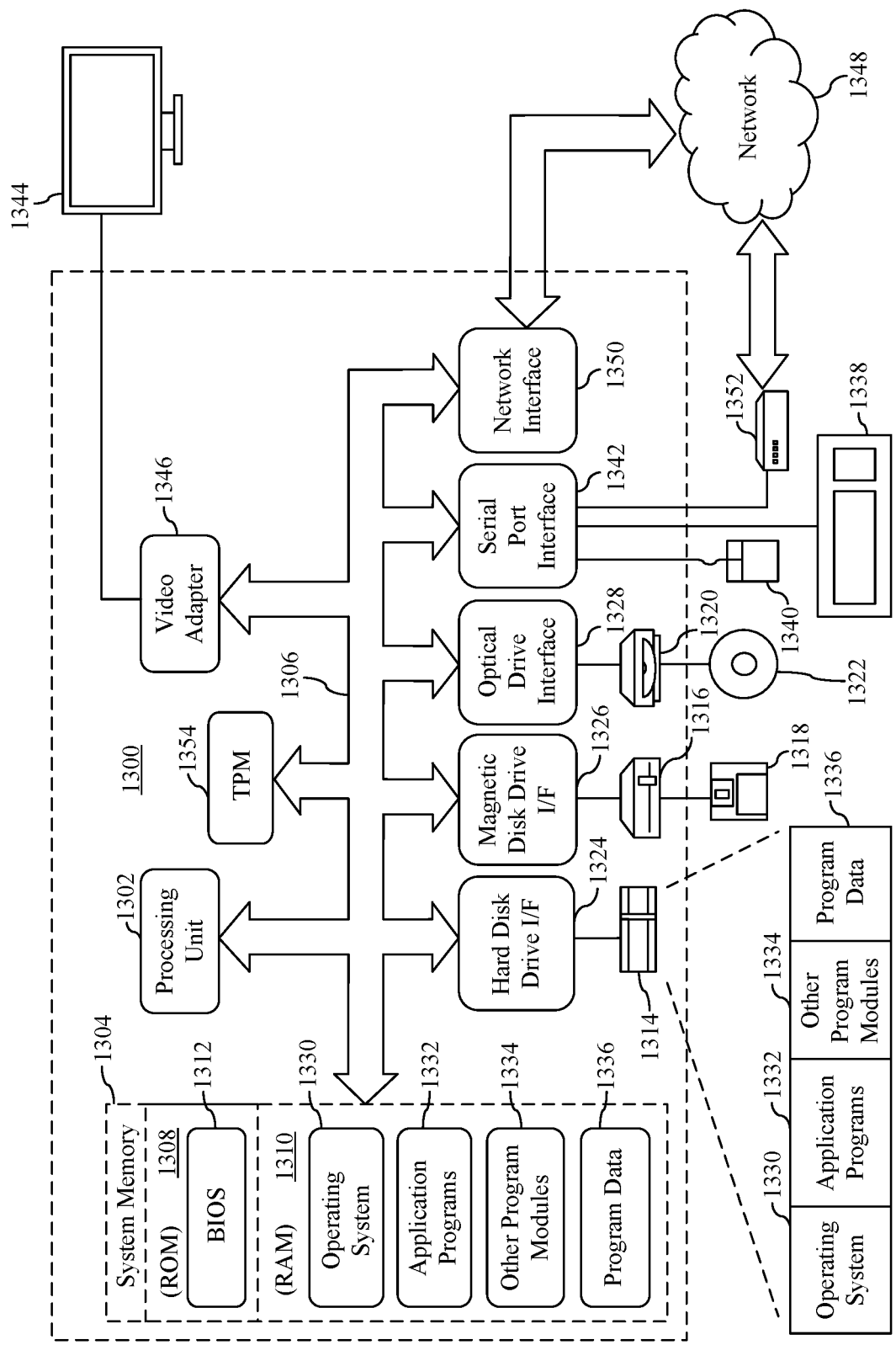
FIG. 13 shows a block diagram of an example computing device that may be used to implement embodiments.

FIG. 13 depicts an exemplary implementation of a computing device 1300 in which embodiments may be implemented. For example, embodiments described herein may be implemented in one or more computing devices or systems similar to computing device 1300, or multiple instances of computing device 1300, in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, servers, and/or clusters, etc., as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing embodiments described herein, such as but not limited to, system 100A in FIG. 1A, system 100B in FIG. 1B, system 200 in FIG. 2, system 300 of FIG. 3, and group 800 of FIG. 8, along with any components and/or subcomponents thereof, as well as the flowcharts/flow diagrams described herein, including portions thereof, and/or further examples described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

TPM 1354 may be connected to bus 1306, and may be an embodiment of any TPM, as would be understood by one of skill in the relevant art(s) having the benefit of this disclosure. For example, TPM 1354 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for secure resource authorization for external identities using remote principal objects. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

As described, secure resource authorization for external identities using remote principal objects improves remote access to secure data resources by utilizing permissions, access policies, and objects in a directory of a domain of a data resource owner that are defined by an external domain and that are also immutable from the domain of the data resource owner—the data resource owner is only permitted to grant or reject access based on the defined permissions and access policies. That is, the embodiments herein utilize strictly governed, provider-defined access conditions for remote principals while allow for protection of an owner's data resources, while at the same time protecting identity information of the remote principals, which was previously not available for software services and applications, much less for cloud-based platforms in which customer tenants permit access to securely stored data resources for other tenants and/or partners via RPOs.

Additionally, the security of computing systems and platforms is improved while still allowing access to secure data resources by external/remote principals. That is, the described embodiments provide for secure data resource access for computing systems and platforms in ways that enable the applications/services running thereon to be maintained in a more secure fashion that still provides for data resource access when needed to perform tasks. Furthermore, the embodiments provided herein for utilizing RPOs do not require the persistence of entries in directories for individual principals of external entities, nor are RPOs persistently stored, in embodiments. ELM functions provide for cleaning up RPOs and access permissions, as well as group memberships, based on lifecycles defined in access policies and on task completion. This reduces the storage requirements and management for directories in computing systems.

The embodiments herein are also extensible beyond cloud-platform/tenant implementations, and are also extensible to existing authentication mechanisms. For example, cloud service provider (CSP) scenarios can be completely built using RPOs and access packages, as described herein. The access packages in such embodiments are generated to define policies that would provide a longer auto approval policies, e.g., years instead of days, and the users/remote principals are enabled to obtain shorter or just-in-time grants (e.g., in periods of hours or days). Accordingly, embodiments are extensible to the CSP mechanisms while providing for safer and more secure access to data resources than a persistent access would as in current models. Additionally, RPOs are configurable to "wids" claims enabling applications/services to that understand tokens in current models to easily migrate to the RPO models described herein. Embodiments herein are scalable and applicable to support different types of existing experiences/tools across different types of existing workloads.

In addition to differences noted in other Sections herein, the described embodiments differ from existing authentication models in other ways. As just one example, the very nature of existing guest-access models provide for a designated guest user persistently stored in the directory of the data resource owner domain, rather than the described RPO lifecycle which provides for a group/team fulfilling a task and has limited temporal validity. As one other example, some existing models have hard dependencies on contracts between two well-known groups. The RPO embodiments provide for more granularity in access control.

For identity providers (IdPs) outside of cloud-based platforms and/or domains associated with data resource ownership and/or requested access, RPOs are also configurable to support IdPs, enabling managed service providers (MSPs) and CSPs that operate across cloud platforms to simplify their access management to data resources in owner domains, without duplication of their identities and increasing the security risk. In other words, the described embodiments provide for equal applicability to first party entities as well as to third party entities.

Still further, while be extensible thereto, the described embodiments do not disrupt existing authentication models such as guest-access and other models. That is, the RPO embodiments herein can be used in addition to, or in lieu of, these existing models which may still be utilized in the same platform/system to serve specific scenarios.

The additional examples and embodiments described in this Section may be applicable to examples disclosed in any other Section or subsection of this disclosure.

Embodiments in this description provide for systems, devices, and methods for secure resource authorization for external identities using remote principal objects. For instance, a system is described herein. The system is enabled and configured for authorizing access by a remote principal of a second domain to a secure data resource in a first domain, according to embodiments. The system includes a processing system that includes one or more processors, and at least one memory that stores program code to be executed by the processing system to perform a method. The method includes receiving from an interface associated with the remote principal a request to access a first domain of a domain host, the first domain being different from the second domain, the request including an identifier and second domain credentials of the remote principal, and determining that the remote principal is associated with a remote principal object generated by, and stored at a directory of, the domain host and inaccessible from the second domain. The method also includes verifying that the remote principal is identified as being associated with a group, of the second domain, having at least one entitlement to the secure data resource as enumerated in a set of permissions and at least one associated access policy defined by the second domain and represented in the remote principal object, and generating an access token for the remote principal that includes the at least one entitlement. The method further includes providing the access token to the remote principal causing a redirect of the interface that provides access to the secure data resource by the remote principal.

In an embodiment of the system, the method includes causing generation of the remote principal object in the first domain at the domain host that links the remote principal to the entitlements based on the set of permissions prior to said determining.

In an embodiment of the system, generating the remote principal object is performed based on an acceptance within the first domain of an access permission approval request for the secure data resource that is initiated in and provided on behalf of the second domain.

In an embodiment of the system, generating the remote principal object includes determining a temporal validity period associated therewith, and the method includes performing at the domain host, and subsequent to an expiration of the temporal validity period, at least one of removing the remote principal object from the directory or removing the set of permissions and the at least one associated access policy from the directory.

In an embodiment of the system, the method includes generating, subsequent to said providing the access token, an audit report including at least one of one or more entries for operations performed by the remote principal on the secure data resource that exclude a personal identifier of the remote principal or indicia of the set of permissions with which the remote principal object is associated.

In an embodiment, the system includes a cloud-based services platform that includes a secure token service configured to generate the access token, and the domain host comprises a first tenancy of the cloud-based services platform, and the second domain comprises a second tenancy of the cloud-based services platform.

In an embodiment of the system, the method includes verifying that an entry of the identity of the remote principal is absent from the directory in the first domain and is present in a directory of the second domain subsequent to said receiving, and performing said determining responsive to said verifying.

A method is also described herein. The method is for authorizing access by a remote principal of a second domain to a secure data resource in a first domain, according to embodiments. The method includes receiving from an interface associated with the remote principal a request to access a first domain of a domain host, the first domain being different from the second domain, the request including an identifier and second domain credentials of the remote principal, and determining that a remote principal object generated and stored at a directory of the domain host and inaccessible from the second domain is present and valid in the directory. The method also includes verifying that the remote principal is identified as being associated with a group, of the second domain, having at least one entitlement to the secure data resource as enumerated in a set of permissions and at least one associated access policy defined by the second domain and represented in the remote principal object, generating an access token for the remote principal that includes the at least one entitlement, and providing the access token to the remote principal causing a redirect of the user interface that provides access to the secure data resource by the remote principal.

In an embodiment, the method includes causing generation of the remote principal object in the first domain at the domain host that links the remote principal to the entitlements based on the set of permissions prior to said determining.

In an embodiment of the method, generating the remote principal object is performed based on an acceptance within the first domain of an access permission approval request for the secure data resource that is initiated in and provided on behalf of the second domain.

In an embodiment of the method, generating the remote principal object includes determining a temporal validity period associated therewith, and the method includes performing at the domain host, and subsequent to an expiration of the temporal validity period, at least one of removing the remote principal object from the directory, or removing the set of permissions and the at least one associated access policy from the directory.

In an embodiment, the method includes generating, subsequent to said providing the access token, an audit report including at least one of one or more entries for operations performed by the remote principal on the secure data resource or indicia of the set of permissions with which the remote principal object is associated.

In an embodiment of the method, generating the access token is performed at a cloud-based services platform by a secure token service thereof, the domain host includes a first tenancy of the cloud-based services platform, and the second domain includes a second tenancy of the cloud-based services platform.

In an embodiment, the method includes identifying one or more remote principal objects in the directory of the first domain that are associated with the second domain, and determining at least one of the one or more remote principal objects as having a group attribute, the remote principal object is included in the at least one of the one or more remote principal objects, and determining that the remote principal is associated with the remote principal object includes determining that the remote principal is identified as a member of the group as represented in the remote principal object.

At least one computer-readable storage medium that stores program instructions that, when executed by one or more processing devices, performs a method, is also described herein. The method is for authorizing access by a remote principal of a second domain to a secure data resource of a first domain, according to embodiments. The method includes receiving from an interface associated with the remote principal a request to access a first domain of a domain host, the first domain being different from the second domain, the request including an identifier and second domain credentials of the remote principal, and determining that the remote principal is associated with a remote principal object generated by, and stored at a directory of, the domain host and inaccessible from the second domain. The method also includes verifying that the remote principal is identified as being associated with a group, of the second domain, having at least one entitlement to the secure data resource as enumerated in a set of permissions and at least one associated access policy defined by the second domain and represented in the remote principal object, generating an access token for the remote principal that includes the at least one entitlement, and providing the access token to the remote principal causing a redirect of the interface that provides access to the secure data resource by the remote principal.

In an embodiment of the at least one computer-readable storage medium, the method includes causing generation of the remote principal object in the first domain at the domain host that links the remote principal to the entitlements based on the set of permissions prior to said determining.

In an embodiment of the at least one computer-readable storage medium, generating the remote principal object is performed based on an acceptance within the first domain of an access permission approval request for the secure data resource that is initiated in and provided on behalf of the second domain.

In an embodiment of the at least one computer-readable storage medium, generating the remote principal object includes determining a temporal validity period associated therewith, and the method includes performing at the domain host, and subsequent to an expiration of the temporal validity period, at least one of removing the remote principal object from the directory or removing the set of permissions and the at least one associated access policy from the directory.

In an embodiment of the at least one computer-readable storage medium, determining that the remote principal is associated with the remote principal object includes determining that the remote principal is also associated with another remote principal object, and generating the access token for the remote principal that includes the at least one entitlement includes generating the access token for the remote principal as also including one or more entitlements to another secure data resource associated with the other remote principal object.

In an embodiment of the at least one computer-readable storage medium, the access token includes an identifier of the remote principal object and does not include a personal identifier of the remote principal.

Another system is also described herein. The system is enabled and configured for authorizing access by a remote principal of a second domain to a secure data resource in a first domain, according to embodiments. The system includes a processing system that includes one or more processors, and at least one memory that stores program code to be executed by the processing system to perform a method. The method includes generating a data structure that specifies a group, at and associated with the second domain, that is based on an access requirement to the secure data resource in the first domain of a domain host, the first domain being different from the second domain, and retrieving a permissions template generated at the second domain, the permissions template defining a set of permissions that include at least one entitlement for members of the group to the secure data resource. The method also includes generating an access policy of the secure data resource that is associated with the set of permissions, and providing the set of permissions and the access policy to the domain host for the first domain, the set of permissions and the access policy being immutable from the first domain. The method further includes providing to the first domain on behalf of the remote principal, as a member of the group, an access permission approval request for the secure data resource causing generation in a directory of the first domain at the domain host of a remote principal object based at least on an indication of an approval of the access permission approval request from the first domain, the remote principal object linking the group to the at least one entitlement for the secure data resource as enumerated in the set of permissions and specified by the access policy.

In an embodiment of the system, the method includes receiving a subsequent access permission approval request from the remote principal or another member of the group subsequent to said providing to the first domain on behalf of the remote principal the access permission approval request, determining at least one of the approval remaining valid or the remote principal object remaining valid in the directory, and notifying the remote principal or the other member of the group of an effective approval for the subsequent access permission approval request.

In an embodiment of the system, the method includes receiving a request from the remote principal for addition to the group, verifying credentials of the remote principal against a group access policy that is specific to the group and that is stored at the second domain, and adding the remote principal to the group by storing remote principal information in the data structure.

In an embodiment of the system, the method includes receiving the indication of the approval of the access permission approval request, and providing a notification of the approval to the remote principal in the second domain.

In an embodiment of the system, the access policy specifies a temporal validity period for the remote principal object, and the method includes causing a removal of the remote principal object, the set of permissions, and the access policy at the domain host for the first domain based on at least one of receiving an access permission revocation from the first domain or an expiration of the temporal validity period.

In an embodiment of the system, the method includes, prior to said generating the data structure, receiving a task request from the first domain, wherein the access requirement to the secure data resource is associated with the task request and a task of the task request includes an operation required on the secure data resource, and causing a removal of the set of permissions and the access policy at the domain host for the first domain based on a completion indication for the task.

In an embodiment of the system, the method includes, prior to said generating the data structure, receiving a task request from the first domain, wherein the access requirement to the secure data resource is associated with the task request, the indication of the acceptance being included in the task request, and the task of the task request including an operation required on the secure data resource.

Another method is also described herein. The method is for authorizing access by a remote principal of a second domain to a secure data resource in a first domain, according to embodiments. The method includes generating a data structure that specifies a group, at and associated with the second domain, that is based on an access requirement to the secure data resource in the first domain of a domain host, the first domain being different from the second domain, and retrieving a permissions template generated at the second domain, the permissions template defining a set of permissions that include at least one entitlement for members of the group to the secure data resource. The method also includes generating an access policy of the secure data resource that is associated with the set of permissions, and providing the set of permissions and the access policy to the domain host for the first domain, the set of permissions and the access policy being immutable from the first domain. The method further includes providing to the first domain on behalf of the remote principal, as a member of the group, an access permission approval request for the secure data resource causing generation in a directory of the first domain at the domain host of a remote principal object based at least on an indication of an approval of the access permission approval request from the first domain, the remote principal object linking the group to the at least one entitlement for the secure data resource as enumerated in the set of permissions and specified by the access policy.

In an embodiment, the method includes receiving a subsequent access permission approval request from the remote principal or another member of the group subsequent to said providing to the first domain on behalf of the remote principal the access permission approval request, determining at least one of the approval remaining valid or the remote principal object remaining valid in the directory, and notifying the remote principal or the other member of the group of an effective approval for the subsequent access permission approval request.

In an embodiment, the method includes receiving a request from the remote principal for addition to the group, verifying credentials of the remote principal against a group access policy that is specific to the group and that is stored at the second domain, and adding the remote principal to the group by storing remote principal information in the data structure.

In an embodiment, the method includes receiving the indication of the approval of the access permission approval request, and providing a notification of the approval to the remote principal in the second domain.

In an embodiment of the method, the access policy specifies a temporal validity period for the remote principal object, and the method includes causing a removal of the set of permissions and the access policy at the domain host for the first domain based on at least one of receiving an access permission revocation from the first domain or an expiration of the temporal validity period.

In an embodiment, the method includes, prior to said generating the data structure, receiving a task request from the first domain, wherein the access requirement to the secure data resource is associated with the task request and a task of the task request includes an operation required on the secure data resource, and causing a removal of the set of permissions and the access policy at the domain host for the first domain based on a completion indication for the task.

In an embodiment, the method includes, prior to said generating the data structure, receiving a task request from the first domain, the access requirement to the secure data resource being associated with the task request, the indication of the acceptance being included in the task request, and a task of the task request includes an operation required on the secure data resource.

Another at least one computer-readable storage medium that stores program instructions that, when executed by one or more processing devices, performs a method, is also described herein. The method is for authorizing access by a remote principal of a second domain to a secure data resource of a first domain, according to embodiments. The method includes generating a data structure that specifies a group, at and associated with the second domain, that is based on an access requirement to the secure data resource in the first domain of a domain host, the first domain being different from the second domain, and retrieving a permissions template generated at the second domain, the permissions template defining a set of permissions that include at least one entitlement for members of the group to the secure data resource. The method also includes generating an access policy of the secure data resource that is associated with the set of permissions, and providing the set of permissions and the access policy to the domain host for the first domain, the set of permissions and the access policy being immutable from the first domain. The method further includes providing to the first domain on behalf of the remote principal, as a member of the group, an access permission approval request for the secure data resource causing generation in a directory of the first domain at the domain host of a remote principal object based at least on an indication of an approval of the access permission approval request from the first domain, the remote principal object linking the group to the at least one entitlement for the secure data resource as enumerated in the set of permissions and specified by the access policy.

In an embodiment of the at least one computer-readable storage medium, the method includes receiving a subsequent access permission approval request from the remote principal or another member of the group subsequent to said providing to the first domain on behalf of the remote principal the access permission approval request, determining at least one of the approval remaining valid or the remote principal object remaining valid in the directory, and notifying the remote principal or the other member of the group of an effective approval for the subsequent access permission approval request.

In an embodiment of the at least one computer-readable storage medium, the method includes receiving a request from the remote principal for addition to the group, verifying credentials of the remote principal against a group access policy that is specific to the group and that is stored at the second domain, and adding the remote principal to the group by storing remote principal information in the data structure.

In an embodiment of the least one computer-readable storage medium, the access policy specifies a temporal validity period for the remote principal object, and the method includes causing a removal of the set of permissions and the access policy at the domain host for the first domain based on at least one of receiving an access permission revocation from the first domain or an expiration of the temporal validity period.

In an embodiment of the at least one computer-readable storage medium, the method includes, prior to said generating the data structure, receiving a task request from the first domain, wherein the access requirement to the secure data resource is associated with the task request and a task of the task request includes an operation required on the secure data resource, and causing a removal of the set of permissions and the access policy at the domain host for the first domain based on a completion indication for the task.

In an embodiment of the at least one computer-readable storage medium, the method includes, prior to said generating the data structure, receiving a task request from the first domain, the access requirement to the secure data resource being associated with the task request, the indication of the acceptance being included in the task request, and a task of the task request including an operation required on the secure data resource.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for authorizing access by a remote principal of a second domain to a secure data resource in a first domain, the system comprising:
   a memory that stores program code; and
   a processing system, comprising one or more processors, configured to receive the program code from the memory and, in response to at least receiving the program code, to:
      generate, at the second domain, an access policy of the secure data resource, the access policy being associated with the set of permissions and including an entitlement to the secure data resource for one or more members of the second domain;
      provide the set of permissions and the access policy to the domain host for the first domain, the set of permissions and the access policy being immutable from the first domain; and
      provide to the first domain on behalf of the remote principal, as a member of the second domain, an access permission approval request for the secure data resource that causes generation in a directory of the first domain at the domain host of a remote principal object based at least on an indication of an approval of the access permission approval request from the first domain, the remote principal object that links the one or more members of the second domain to the at least one entitlement for the secure data resource as enumerated in the set of permissions and specified by the access policy.

2. The system of claim 1, wherein the processing system is configured, in response to the at least receiving the program code, to:
    receive a subsequent access permission approval request from the remote principal or another member of the second domain subsequent to said providing to the first domain on behalf of the remote principal the access permission approval request;
    determine at least one of:
        the approval remaining valid, or
        the remote principal object remaining valid in the directory; and
    notify the remote principal or the other member of the second domain of an effective approval for the subsequent access permission approval request.

3. The system of claim 1, wherein the processing system is configured, in response to the at least receiving the program code, to:
    receive a subsequent access permission approval request from the remote principal or another member of the second domain subsequent to said providing to the first domain on behalf of the remote principal the access permission approval request;
    determine at least one of:
        the approval being revoked from the first domain, or
        the access policy being expired; and
    perform at least one of:
        notify the remote principal or the other member of the second domain of a denial for the subsequent access permission approval request, or
        deny access to the secure data resource.

4. The system of claim 1, wherein the processing system is configured, in response to the at least receiving the program code, to:
    receive a subsequent access permission approval request from the remote principal or another member of the second domain subsequent to said providing to the first domain on behalf of the remote principal the access permission approval request, the subsequent access permission approval request being for another task that is different than a task for the access permission approval request;
    determine that the subsequent access permission approval request has been denied from the first domain;
    notify the remote principal or the other member of the second domain of a denial for the subsequent access permission approval request; and
    allow access to the secure data resource in association with the task of the access permission approval request.

5. The system of claim 1, wherein the one or more members of the second domain comprises a software application or a service of the second domain.

6. The system of claim 1, wherein the first domain is a tenancy hosted by a cloud-based platform; and
    wherein the second domain is a different tenancy associated with the cloud-based platform or an external domain with respect to the cloud-based platform.

7. The system of claim 1, wherein the directory of the first domain at the domain host in which the remote principal object is generated is a platform directory across the cloud-based platform.

8. A method for authorizing access by a remote principal of a second domain to a secure data resource in a first domain, the method comprising:
    generating, at the second domain, an access policy of the secure data resource, the access policy being associated with the set of permissions and including an entitlement to the secure data resource for one or more members of the second domain;
    providing the set of permissions and the access policy to the domain host for the first domain, the set of permissions and the access policy being immutable from the first domain; and
    providing to the first domain on behalf of the remote principal, as a member of the second, an access permission approval request for the secure data resource causing generation in a directory of the first domain at the domain host of a remote principal object based at least on an indication of an approval of the access permission approval request from the first domain, the remote principal object linking the one or more members of the second domain to the at least one entitlement for the secure data resource as enumerated in the set of permissions and specified by the access policy.

9. The method of claim 8, further comprising:
    receiving a subsequent access permission approval request from the remote principal or another member of the second domain subsequent to said providing to the first domain on behalf of the remote principal the access permission approval request;
    determining at least one of:
        the approval remaining valid, or
        the remote principal object remaining valid in the directory; and
    notifying the remote principal or the other member of the second domain of an effective approval for the subsequent access permission approval request.

10. The method of claim 8, further comprising:
    receiving a subsequent access permission approval request from the remote principal or another member of the second domain subsequent to said providing to the first domain on behalf of the remote principal the access permission approval request;
    determining at least one of:
        the approval being revoked from the first domain, or
        the access policy being expired; and
    performing at least one of:
        notifying the remote principal or the other member of the second domain of a denial for the subsequent access permission approval request, or
        denying access to the secure data resource.

11. The method of claim 8, further comprising:
    receiving a subsequent access permission approval request from the remote principal or another member of the second domain subsequent to said providing to the first domain on behalf of the remote principal the access permission approval request, the subsequent access permission approval request being for another task that is different than a task for the access permission approval request;
    determining that the subsequent access permission approval request has been denied from the first domain;

notifying the remote principal or the other member of the second domain of a denial for the subsequent access permission approval request; and allowing access to the secure data resource in association with the task of the access permission approval request.

12. The method of claim 8, wherein the one or more members of the second domain comprises a software application or a service of the second domain.

13. The method of claim 8, wherein the first domain is a tenancy hosted by a cloud-based platform; and
wherein the second domain is a different tenancy associated with the cloud-based platform or an external domain with respect to the cloud-based platform.

14. The method of claim 8, wherein the directory of the first domain at the domain host in which the remote principal object is generated is a platform directory across the cloud-based platform.

15. At least one computer-readable storage medium that stores program instructions that, when executed by one or more processing devices, performs a method for authorizing access by a remote principal of a second domain to a secure data resource of a first domain and at a domain host thereof, the method comprising:
generating a permissions template, at the second domain, which includes identity data for members of the group and which defines a set of permissions that include at least one entitlement for the members of the group to the secure data resource;
generating an access policy of the secure data resource that is based at least on the identity data and that is associated with the set of permissions, the set of permissions and the access policy being immutable from the first domain; and
accessing the secure data resource via a remote principal object that is caused to be generated in a directory of the first domain at the domain host based at least on a request from the second domain, the remote principal object linking the group to the at least one entitlement for the secure data resource as enumerated in the set of permissions and specified by the access policy that are provided to the first domain.

16. The at least one computer-readable storage medium of claim 15, wherein remote principal object is caused to be generated based at least on an access permission approval request that is provided to the first domain;
wherein the method further comprises:
receiving a subsequent access permission approval request from the remote principal or another member of the second domain subsequent to the access permission approval request being provided to the first domain;
determining at least one of:
an approval of the access permission approval request remaining valid, or
the remote principal object remaining valid in the directory; and
notifying the remote principal or the other member of the second domain of an effective approval for the subsequent access permission approval request.

17. The at least one computer-readable storage medium of claim 15, wherein remote principal object is caused to be generated based at least on an access permission approval request that is provided to the first domain;
wherein the method further comprises:
receiving a subsequent access permission approval request from the remote principal or another member of the second domain subsequent to the access permission approval request being provided to the first domain;
determining at least one of:
the approval being revoked from the first domain, or
the access policy being expired; and
performing at least one of:
notifying the remote principal or the other member of the second domain of a denial for the subsequent access permission approval request, or
denying access to the secure data resource.

18. The at least one computer-readable storage medium of claim 15, wherein remote principal object is caused to be generated based at least on an access permission approval request that is provided to the first domain;
wherein the method further comprises:
receiving a subsequent access permission approval request from the remote principal or another member of the second domain subsequent to the access permission approval request being provided to the first domain, the subsequent access permission approval request being for another task that is different than a task for the access permission approval request;
determining that the subsequent access permission approval request has been denied from the first domain;
notifying the remote principal or the other member of the second domain of a denial for the subsequent access permission approval request; and
allowing access to the secure data resource in association with the task of the access permission approval request.

19. The at least one computer-readable storage medium of claim 15, wherein the one or more members of the second domain comprises a software application or a service of the second domain; or
wherein the first domain is a tenancy hosted by a cloud-based platform and the directory of the first domain at the domain host in which the remote principal object is generated is a platform directory across the cloud-based platform.

20. The at least one computer-readable storage medium of claim 15, wherein the first domain is a tenancy hosted by a cloud-based platform; and
wherein the second domain is a different tenancy associated with the cloud-based platform or an external domain with respect to the cloud-based platform.

* * * * *